US011144365B1

United States Patent
Gordon et al.

(10) Patent No.: US 11,144,365 B1
(45) Date of Patent: Oct. 12, 2021

(54) AUTOMATIC CLUSTERING OF USERS FOR ENABLING VIRAL ADOPTION OF APPLICATIONS HOSTED BY MULTI-TENANT SYSTEMS

(71) Applicant: MICROSOFT TECHNOLOGY LICENSING, LLC, Redmond, WA (US)

(72) Inventors: Ariel Gordon, Mercer Island, WA (US); Balagopal Chenicheri, Renton, WA (US); Megan M. Rawley, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/888,645

(22) Filed: May 29, 2020

(51) Int. Cl.
*G06F 9/50* (2006.01)
*G06F 9/46* (2006.01)
*H04L 29/08* (2006.01)
*G06F 21/31* (2013.01)

(52) U.S. Cl.
CPC ............ *G06F 9/5077* (2013.01); *G06F 9/468* (2013.01); *G06F 21/31* (2013.01); *H04L 67/306* (2013.01); *G06F 2221/2141* (2013.01)

(58) Field of Classification Search
CPC ........ G06F 9/5077; G06F 9/468; G06F 21/31; G06F 2221/2141; H04L 67/306
See application file for complete search history.

(56) References Cited

PUBLICATIONS

Pal, Sanjukta et al, "Application Multi-Tenancy for Software as a Service", Mar. 2015, ACM Sigsoft Software Engineering Notes, vol. 40, No. 2, pp. 1-8. (Year: 2015).*
Garcia-Galan, Jesus et al, "User-Centric Adaptation Analysis of Multi-Tenant Services", Jan. 2016, ACM Transactions on Autonomous and Adaptive Systems, vol. 10, No. 4, Article 24, pp. 24:1-24:26. (Year: 2016).*

* cited by examiner

*Primary Examiner* — Azizul Choudhury
(74) *Attorney, Agent, or Firm* — Newport IP, LLC; Scott Y. Shigeta

(57) ABSTRACT

The techniques disclosed herein enable systems to utilize the network effect of end-user viral adoption of collaborative services and applications hosted by multi-tenant computing systems. A system can achieve this by automatically clustering users who independently send requests to generate new tenants. A number of factors can enable a system to cluster users into a single tenant including characteristics of requests to generate new tenants and/or member identities received in association with requests to generate new tenants. Examples of request characteristics can include network addresses indicating a source of each request, a domain name or entity names received in association with a request, a rate in which requests are received, and/or heuristic techniques that utilize various combinations of these and other factors. The automatic selection of users for specific tenants allows a system to allow viral user adoption without a centralized IT manager.

20 Claims, 22 Drawing Sheets

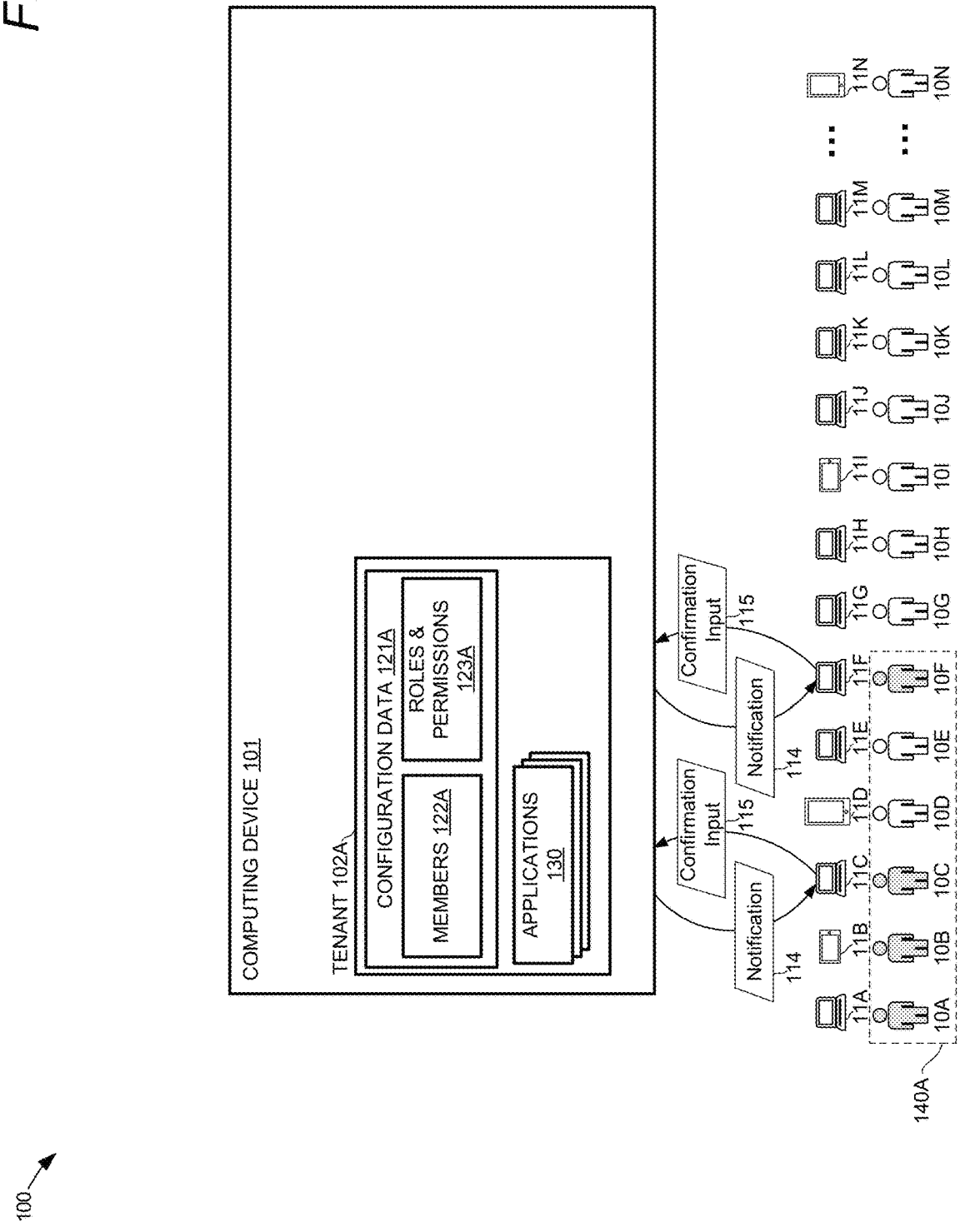

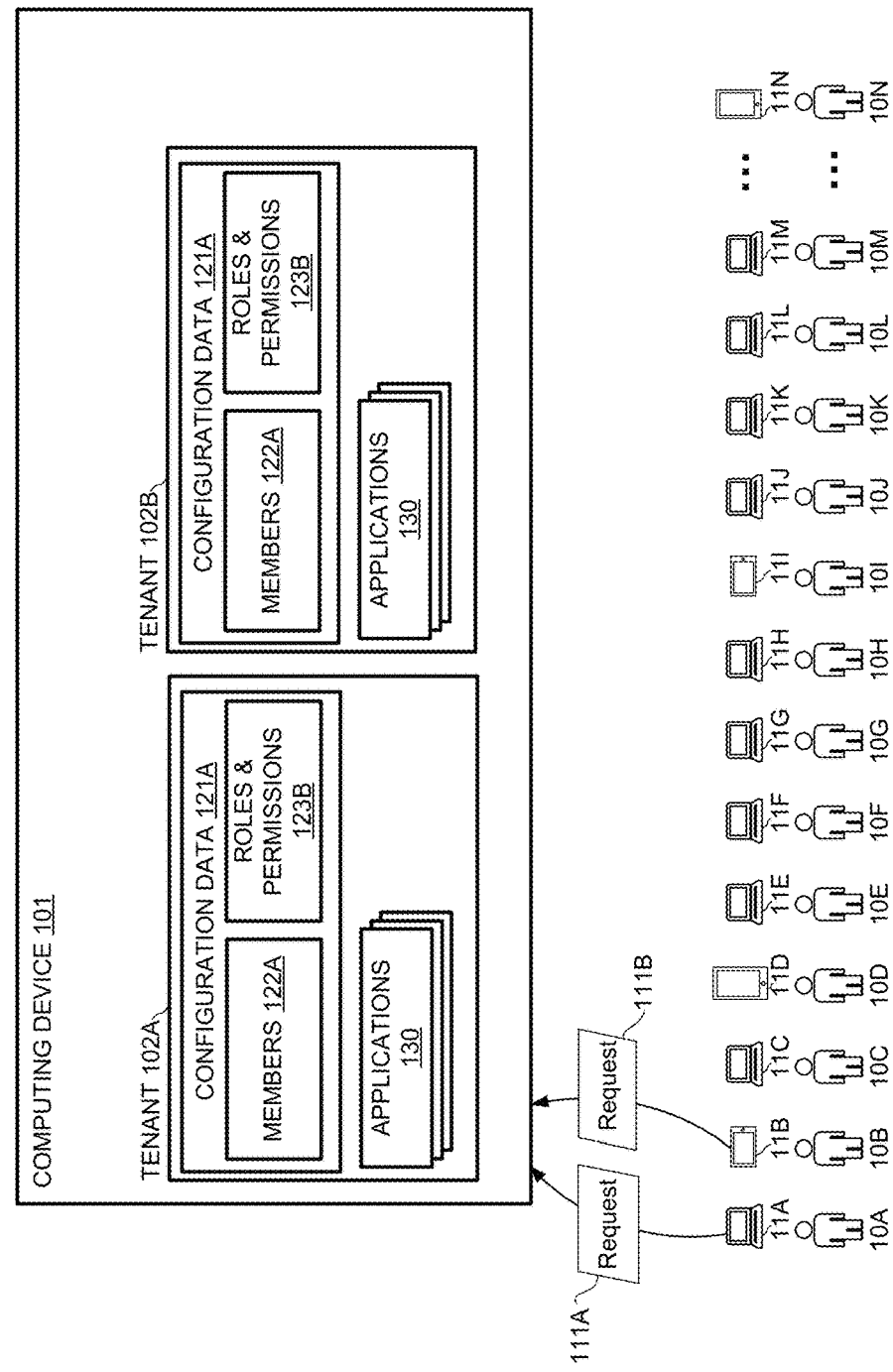

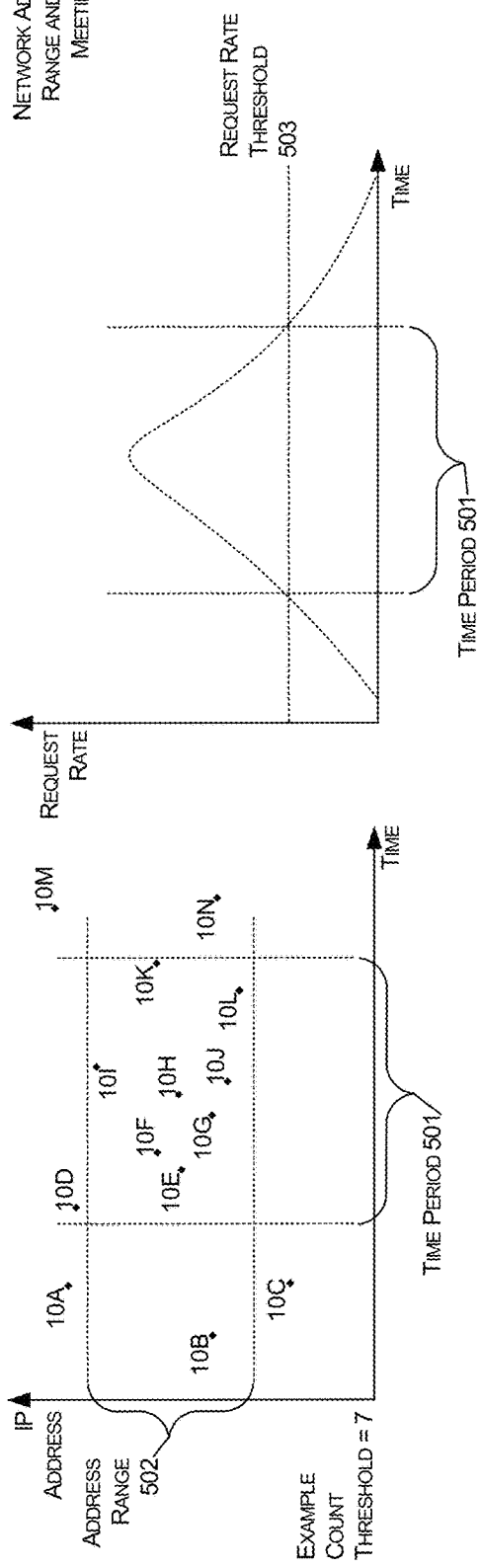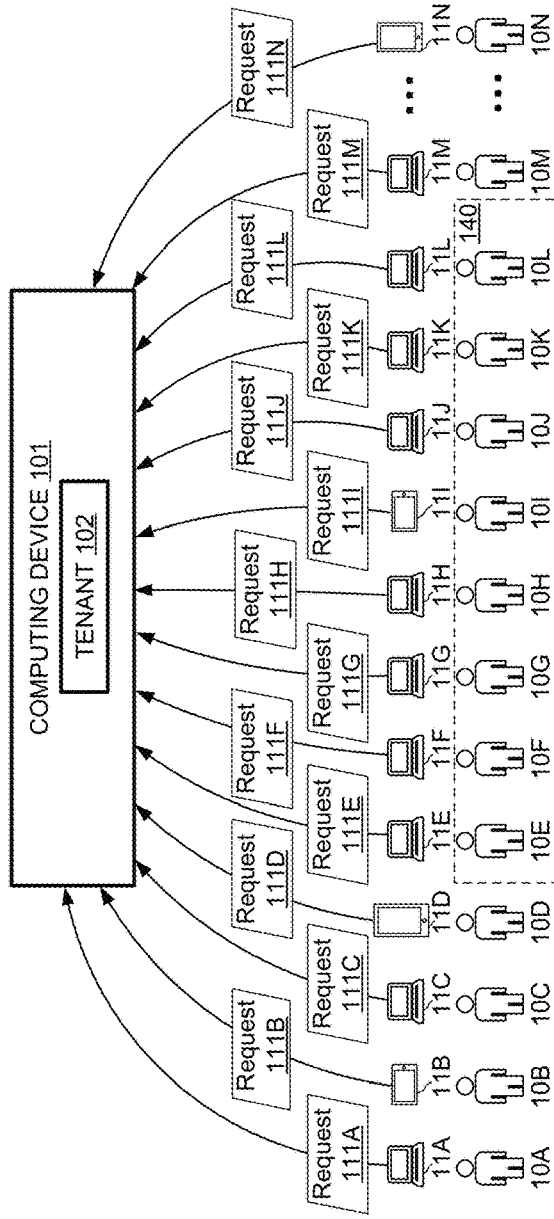
FIGURE 4
NETWORK ADDRESSES WITHIN A RANGE AND REQUEST RATE MEETING CRITERIA

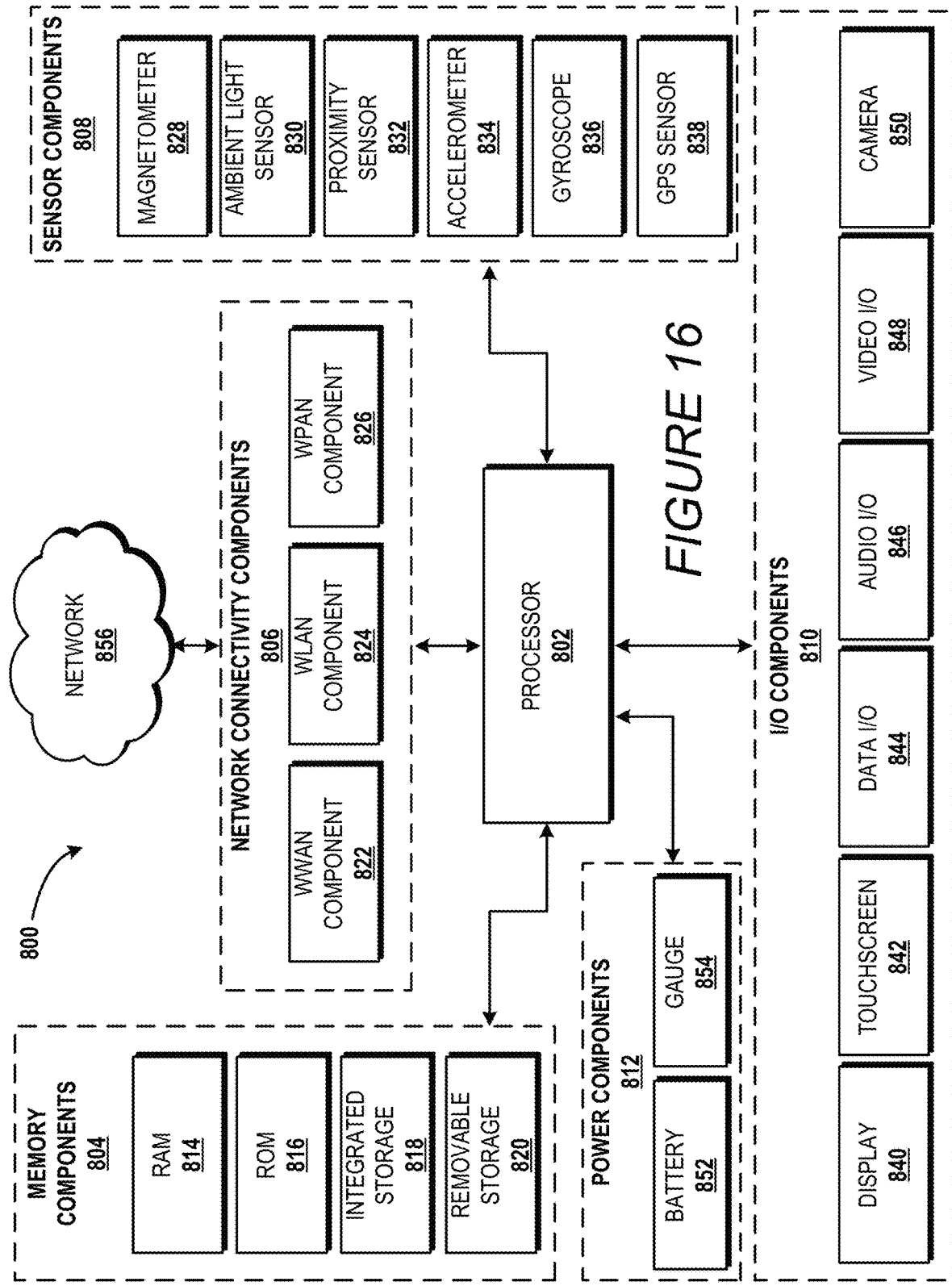

AUTOMATIC CLUSTERING OF USERS FOR ENABLING VIRAL ADOPTION OF APPLICATIONS HOSTED BY MULTI-TENANT SYSTEMS

BACKGROUND

Software as a service (SaaS) is a software licensing and delivery model in which software can be licensed on a subscription basis and is centrally hosted. SaaS is sometimes referred to as "on-demand software" or "software plus services." SaaS applications can be accessed by users using a rich client or a thin client, e.g. a cloud application that can be displayed via a web browser. SaaS has become a common delivery model for many business applications including, but not limited to, office software, messaging software, CAD software, development software, and collaboration software.

In the early days of SaaS, applications were typically adopted by IT administrators on behalf of their organizations. IT administrators would then provision user accounts on the SaaS platforms for all users in their organization and manage user credentials to end users. Recently, cloud identity platforms such as Microsoft Azure Active Directory has made it dramatically easier to adopt, configure and deploy SaaS applications. However, in a majority of the cases, the user adoption of such platforms is still driven by IT departments.

In contrast, self-service or "viral" adoption motions happen when end-users decide to adopt a SaaS application to fit a specific business need. End users can be employees of a company or students in an educational institution. A large number of SaaS application have a social dimension, in the sense that the value of the application grows as a function of the number of users that one can collaborate with. This is especially true for online communication/collaboration applications such as Microsoft Teams.

Most organization SaaS applications are designed around the core principle of establishing a security "perimeter" to represent an organization. This "directory" or "tenant" serves as a security and privacy perimeter inside of which users can discover each other and share content in a simplified manner, while users on the outside have restricted access.

When IT administrators adopt a SaaS application, they typically create their own tenant and provision their organization's users in the SaaS application's tenant. But when-end users adopt a SaaS application via a viral motion, this is a lot more complicated. If each user sign-up results in a separate tenant, coworkers cannot discover each other, and the value of the application is dramatically reduced. Thus, there is a need for SaaS providers to invest in different strategies that ensure colleagues and/or coworkers end up in the same tenant, yet also provide an independent way for individuals to utilize self-service or viral adoption methods.

SUMMARY

The disclosed techniques automatically cluster users to enable the network effect of end-user viral adoption of applications and other collaborative services hosted on multi-tenant computing systems. A system can utilize a number of factors to cluster users, including: a list of tenant members provided by an end-user or characteristics of requests received from a number of users intending to generate new tenants. Examples of request characteristics can include, but are not limited to, a rate in which requests are received, network addresses indicating a source of each request, a domain name associated with an identity of a user sending a request, a number of requests that are received within a predetermined time period, entity names received in association with individual requests, and/or heuristic techniques that utilize various combinations of these and other factors.

By using such factors, a system can select specific users for a tenant even if individual users send requests using emails having different domains. Thus, even if a number of individuals send requests to generate a number of different tenants from the same or different email domains, e.g., Gmail, Yahoo, Comcast, Outlook, the system can analyze specific characteristics of the request to automatically cluster users that are likely to be working together. The automatic selection of users for specific tenants allows a system to benefit from viral user adoption and formation of a federated domain without a centralized IT manager. The automatic selection of users for specific tenants also enables a system to mitigate the generation of forked tenants, which is a typical result of existing systems that do not cluster users. Without the clustering techniques disclosed herein, forked tenants unintentionally isolate co-workers or team members from one another in separate computing environments. By mitigating the generation of forked tenants, the disclosed techniques can improve the success, adoptability, usability, and security of a multi-tenant system.

In some embodiments, a computing system can receive a number of requests from multiple users each attempting to create individual tenants. When a request from a particular user identifies members of a particular tenant, each person listed as a member can receive an invitation to join the tenant when they submit a request to create their own tenant. The invitation can allow each person to join the existing tenant or create their own independent tenant. When members respond to the invitation, and successfully perform one or more authentication processes, access permissions are granted to each responding member allowing them to join a tenant to find one another, share information, and use applications managed by the tenant. Such embodiments can mitigate the creation of separate tenants, e.g., forked tenant groups, which can otherwise result when systems do not cluster multiple users requesting to sign-up for a tenant.

In some embodiments, a system can receive a number of requests from multiple users, with each request resulting in the creation of a number of separate tenants. This situation may occur when the users do not provide a list of members. When an individual user provides identities of other users they wish to add as members of a particular tenant, such as a list of email addresses and/or phone numbers, invitations are sent to each listed user to join the tenant. Each user has the option to join that particular tenant and cancel other independently managed tenants. Alternatively, each other can ignore the invitation and continue operating in a separate tenant.

In some embodiments, a system can receive a number of requests for multiple users to create a number of independently managed tenants. If a number of requests received within a predetermined time exceeds a threshold, e.g., a request rate exceeds a rate threshold, a system can cluster the users associated with the requests into a single tenant. The system can also filter individual users based on a domain name associated with their requests, and IP address associated with their requests, and/or an entity name associated with their requests.

It should be appreciated that the subject matter described herein may be implemented as a computer-controlled apparatus, a computer process, a computing system, or as an article of manufacture such as a computer-readable storage medium. In addition to maximizing a system's ability to benefit from viral user adoption activity without a centralized IT manager, the techniques described herein also provide improved efficiencies with respect to a wide range of computing resources. For example, the techniques for automatically clustering users for specific tenants can reduce the amount of computing resources, including but not limited to, processing resources and networking resources, that would be used if a system didn't cluster users and ultimately created a tenant for each request. The techniques for automatically clustering users for specific tenants can also improve a user's interaction with a device. For example, when users are automatically clustered into a particular tenant, users do not have to interact with a number of interfaces, which would be required if a system didn't cluster users and ultimately placed users in separate tenants.

The techniques disclosed herein can also improve the security of multi-tenant systems. For example, the disclosed techniques can automate a process in which permissions are allocated to members of a tenant. Instead of requiring each user manually to set permissions, a system can receive a single set of permissions provided by a single user and replicate those permissions to each user that is invited to a group. In addition, when the system merges different groups of users from multiple tenants, a single set of permissions can be allocated to both groups, thus simplifying a fit configuration process for a potentially large group of users. By providing an automated process for setting permissions, security loopholes that can be created by an inadvertent input and human error can be mitigated.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2E shows aspects of a process of granting roles and permissions to users that respond to an invitation to join an established tenant.

FIG. 3A shows aspects of a system generating multiple tenants in response to receiving requests from multiple users.

FIG. 4 is a block diagram of a system for utilizing the network effect of end-user viral adoption of services and applications by clustering users to a tenant based on network addresses associated with requests to create new tenants and a rate in which the requests are received.

FIG. 16 is a computer architecture diagram illustrating a computing device architecture for a computing device capable of implementing aspects of the techniques and technologies presented herein.

DETAILED DESCRIPTION

Figure 1:
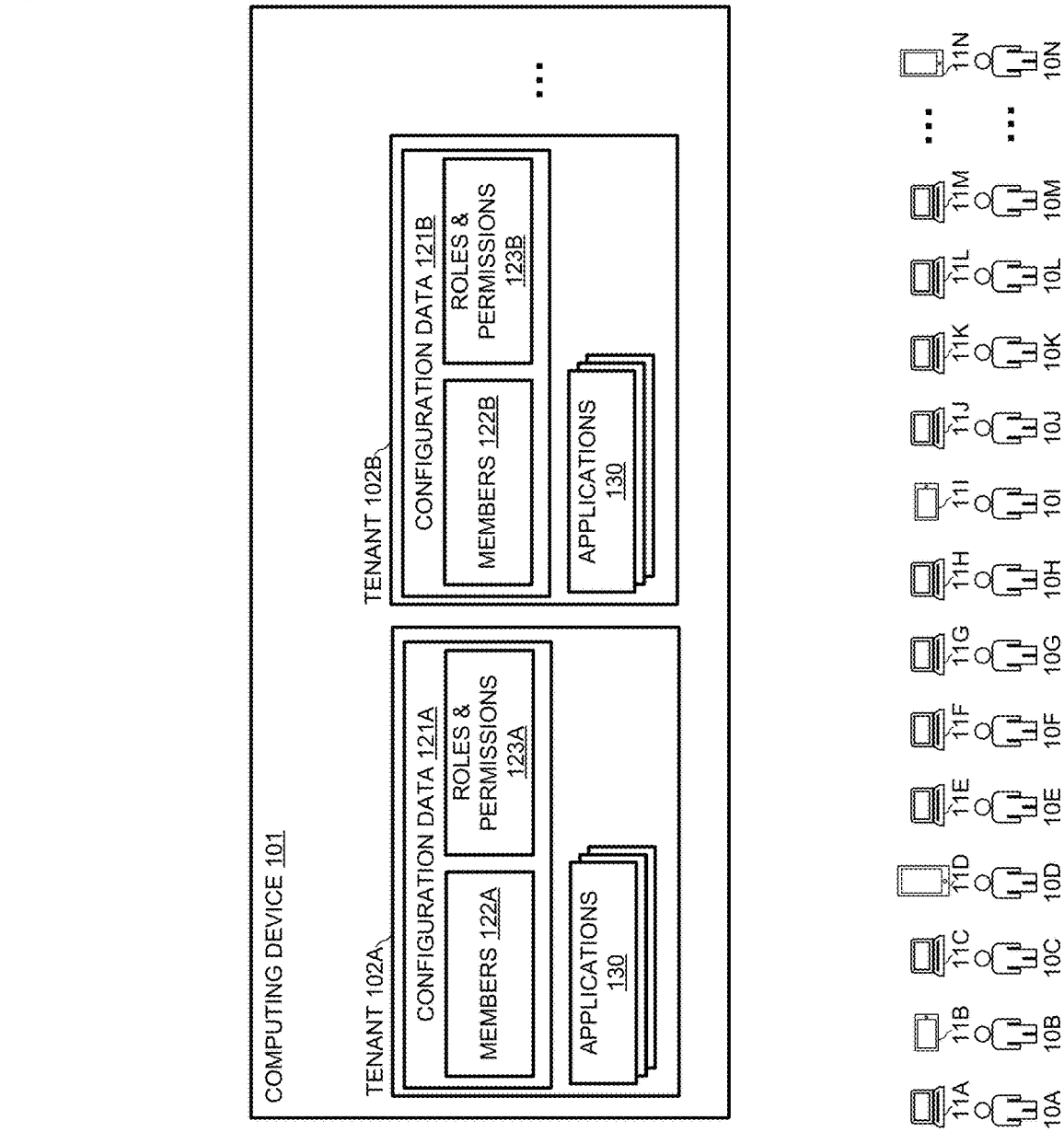
FIG. 1 is a block diagram of a system for utilizing the network effect of end-user viral adoption of collaborative services and applications hosted by multi-tenant computing systems.

FIG. 1 illustrates a system 100 that can automatically cluster users to enable the network effect of end-user viral adoption of applications and other services of a multi-tenant host. The system can utilize a number of factors to cluster users, including: a list of user tenant members provided by an end-user and/or characteristics of requests received from a number of users intending to generate new tenants. In one illustrative example, the system 100 can include a centralized computing device 101 and a number of network-connected client computing devices 11 that can be accessed by individual users 10. The computing device 101 can be configured to generate and manage a number of tenants 102. The configuration data 121 can define a number of aspects of each tenant including, membership data 122 defining members for a particular tenant, and permission data 123 for defining roles and permissions for each member of a particular tenant. Each tenant can also be configured to manage a number of applications 130. Users 10 who are designated as members of a particular tenant can be provided access to applications 130 hosted by according to the permissions data 123. The system 100 illustrated in FIG. 1 is provided for illustrative purposes and is not to be construed as limiting. It can be appreciated that a computing device 101 can accommodate any suitable number of client computing devices 11 and any suitable number of tenants 102.

The computing device 101 can manage a service for providing users access to the applications 130, also referred to herein as software 130. The service can include a multi-tenant architecture, which can be referred to as a multi-tenant software as a service (SaaS) architecture. The computing device 101 can be configured to associate an entity with an individual tenant 102. An entity may include a company, organization, or a group of individuals. Each member of an entity can be associated with a unique identifier, such as a phone number or an email address. Once individual users are confirmed as members of a tenant, the members can receive a predetermined set of permissions that allow each member to find each other, store and share data, engage in multiuser content editing sessions, and access the applications 130. The applications 130 can include any type of software that allows users to view, edit and/or communicate various forms of content. The applications 130 can include, but are not limited to email applications, communication applications, storage applications, word processing applications, spreadsheet applications, CAD applications, CRM applications, etc.

In one illustrative example, an entity may include a school and the members may include the teachers and students of the school. Once the teachers and students are granted access rights with a tenant, such as the first tenant 102A, the teachers and students may share information and access the hosted applications 130 according to a set of permissions. Each tenant is configured to provide an isolated computing environment from other tenants. Thus, if another tenant, such as the second tenant 102B, is associated with a company, members of the second tenant 102 would not be able to discover the users of the first tenant or have any access to data or applications hosted by the first tenant 102A.

Referring now to FIGS. 2A-2E, an example scenario involving a system that clusters users based on member identities that are received in association with requests to generate new tenants. In this example, a first user, Alice, signs up for a tenant using the email address, alice@yahoo.com. In the sign-up flow, Alice also provides an email address of a coworker, Bob, using an email address, bob@outlook.com. Although an email is used in this example, any suitable identifier for an invitee can be used, e.g., a phone number, etc. In this embodiment, when a person engages with a sign-up flow for a tenant, the system checks for any pending invitations that may match that person's username. Thus, when Bob tries to sign up with his email address, bob@outlook.com, the system checks for a pending invitation and determines that there is a pending invitation that was sent by Alice. The system then gives Bob a chance to join Alice's tenant instead of creating his own. Bob can still be sign up for his own tenant and/or join Alice's tenant. The system can also give Bob the option to join Alice's tenant and cancel his original request to create his own tenant. As described in more detail below, this example also involves an authentication process and features for allowing the first user to establish permissions and roles for a particular tenant.

Figure 2A:
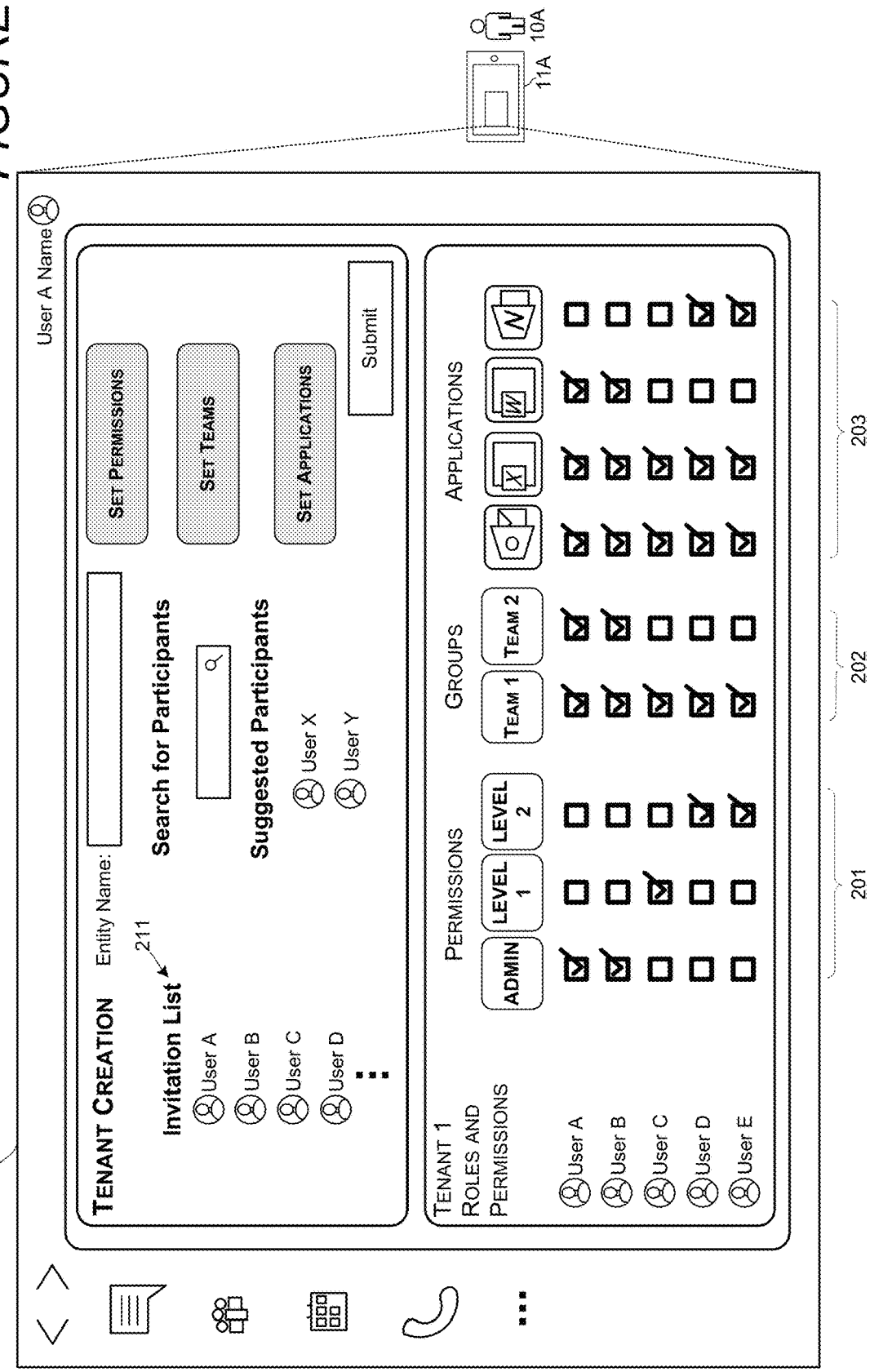
FIG. 2A shows an example user interface for a request to configure a tenant, the user interface allowing a selection of members to invite to a tenant.

FIG. 2A illustrates an example user interface 117 that may be utilized by a first user 10A, e.g., Alice, operating a first client computer 11A. In such embodiments, the first user can specify a list of users they wish to invite to their tenant, e.g., the first tenant 102A. As shown in FIG. 2A, user interface 117 allows the first user to browse from a list of suggested users and conduct a search of participants. Each selected identity can be added to an invitation list 211. Each person that is added to the invitation list 211 can be associated with any suitable identifier, such as an email address, phone number, etc.

Also shown in FIG. 2A, the user interface 117 can also allow the first user to assign roles and permissions for people they invite to their tenant. In this example, the first user can select different permissions for each invitee, such as administrative permissions and other levels of permissions permitting different types of access to stored data. The administrative permissions, for example, may allow a designated invitee to edit permissions for other members of the tenant. The administrative permissions may also allow a designated invitee to add or remove individual members of a tenant. For illustrative purposes the Level 1 permissions may, for example, permit read and write access to stored files and, and the Level 2 permissions may only allow read access to stored files. The Level 1 and Level 2 permissions may not allow designated invitees to change permissions for other members. These examples are provided for illustrative purposes and are not to be construed as limiting, as it can be appreciated that the embodiments disclosed herein can include other types of permissions, each of which may be applied to specific categories of stored data.

The example user interface 117 also allows the first user to select various groups, e.g., Channels or Teams, for each invitee. The user interface 117 also allows for the selection of applications 130 that may be provided to each invitee. In this example, various invitee and the first user have been granted access to applications such as an email application, a spreadsheet application, a word processing application, and a note application.

Figure 2B:
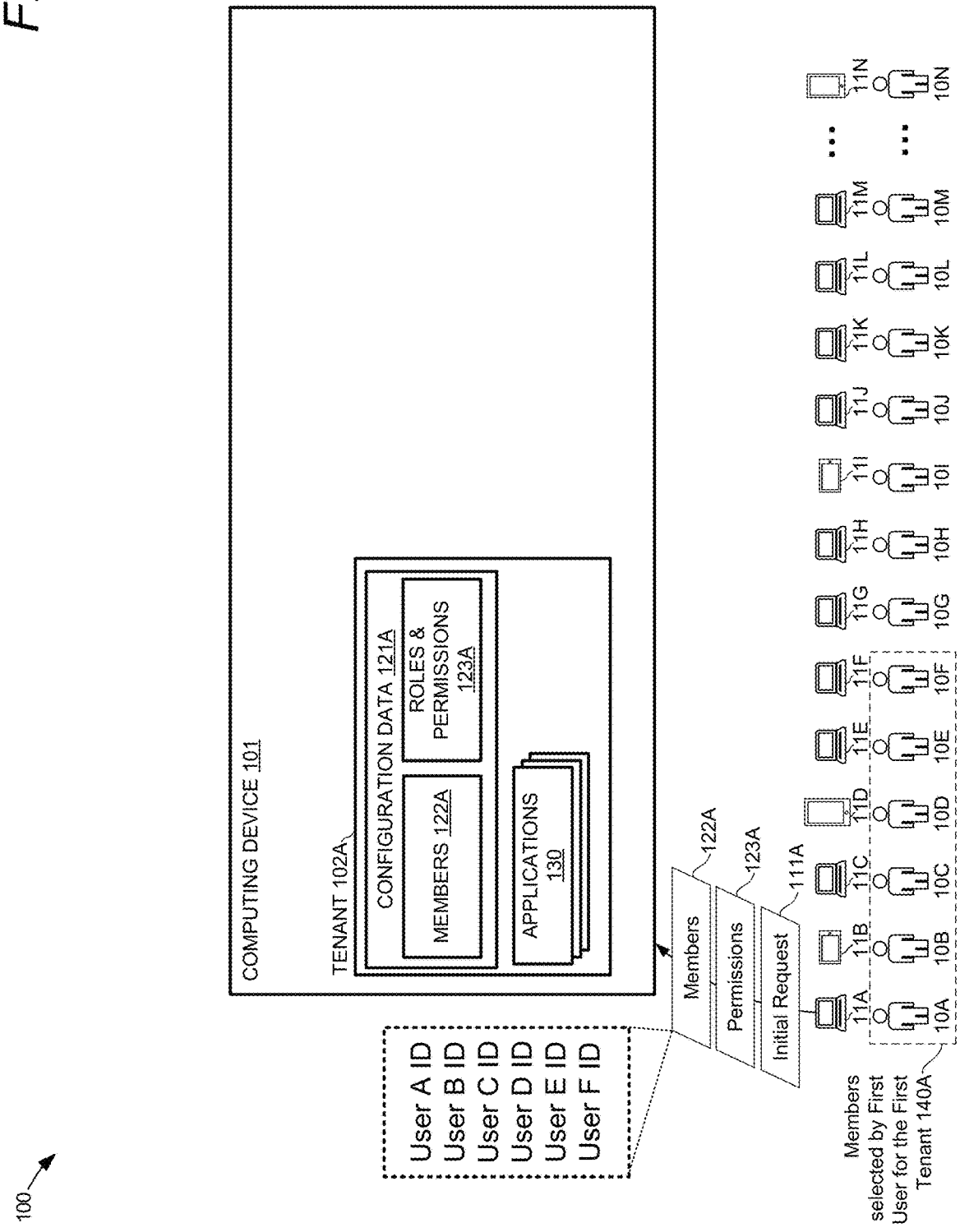
FIG. 2B shows aspects of configuration data that may be received in conjunction with a request for configuring a tenant.

As shown in FIG. 2B, once the first user has entered the configuration data for the tenant they wish to create, the client device 11A can send a first request 111A with the tenant configuration data to the multi-tenant server, the device 101. As shown, the first user can also provide the permission data 123A and any member data 122A that can be used to configure the first tenant 102A. As described above, the computing device 101 can be configured to store the member data at 122A and the permission data 123A in association with the first tenant 102A. In this illustrative example, based on the member data 122A provided by the first user 10A, the system designates the first user 10A through the sixth user 10F as members 140A of the first tenant 102A.

In response to receiving the member data 122A, the device 101 may send an invitation, also referred to herein as a notification, to each invitee listed in the member data. In some configurations, the system may require each invitee listed in the member data 122A to authenticate their identities prior to sending any type of notification or invitation to each invitee. With reference to the current example, the device 101 can be configured to only notify Bob of the invitation from Alice after Bob has verified his identity. Any suitable authentication technique can be used in this part of the process. For example, an email can be sent to Bob, and the email may require Bob to provide a verification input, code, or password. Then, in response to a successful verification from Bob, details of the invitation, e.g., Alice's identity, can be revealed. Such features restricting the disclosure of an invitation until an invitee has passed a verification process can help a system mitigate privacy concerns.

Figure 2C:
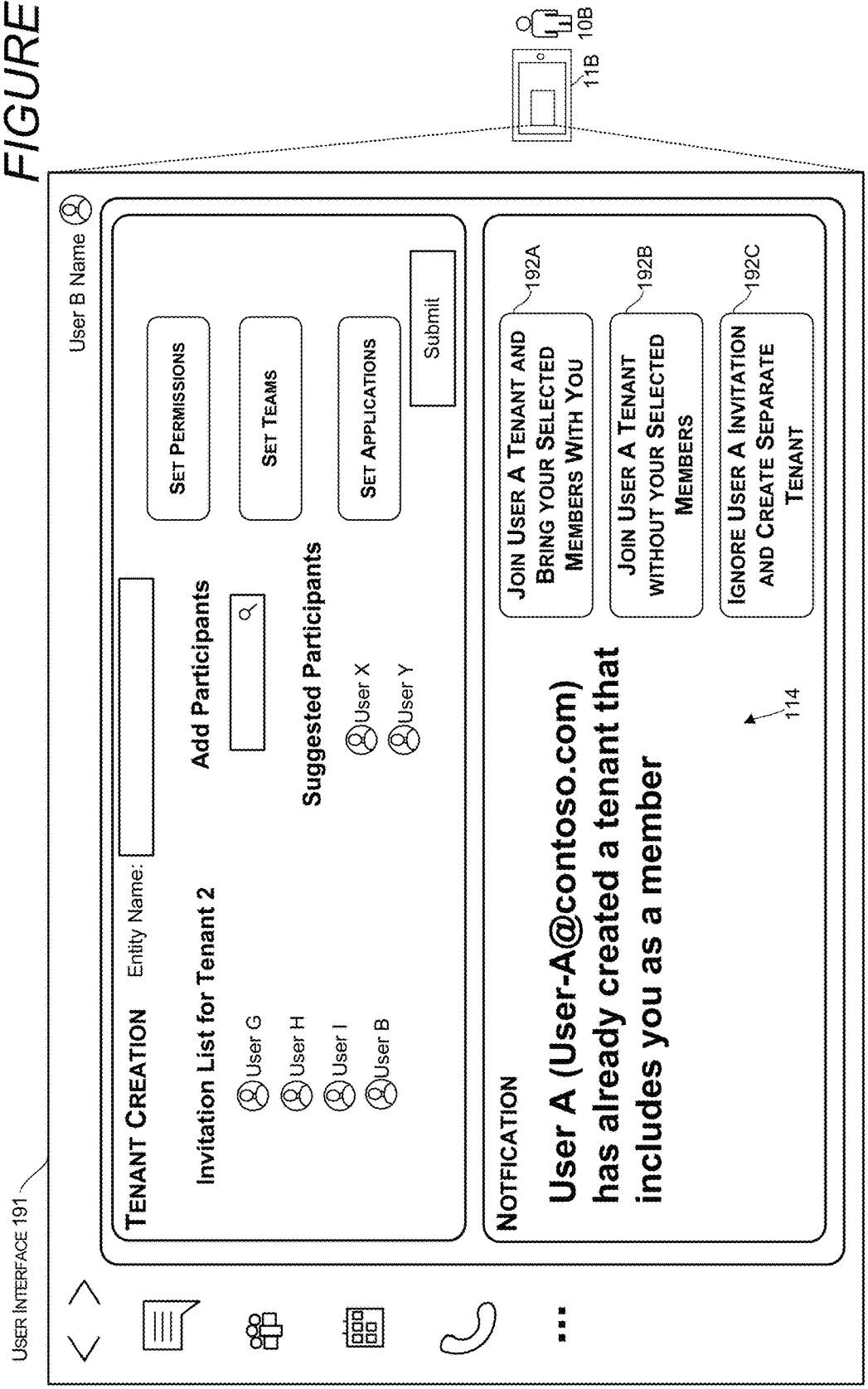
FIG. 2C shows an example user interface showing a notification to a person who is invited to join an established tenant.

In some configurations, an invitation can be sent in the form of an email or another suitable message format. The invitation can prompt the user to accept the invitation and join the tenant. In other configurations, the invitation can be displayed on a user interface for creating new tenants. For example, FIG. 2C is an example user interface 191 that may be displayed to the second user operating the second client 11B when the second user desires to create his or her own tenant. As shown, as soon as the second user provides his or her identity, e.g., a phone number or email address, the computing device may cause the display of the invitation 114 on the user interface 191. By displaying the invitation 114 in this context, e.g., while the second user is in the process of configuring a new tenant, the system can conserve computing resources by inviting the second user to an existing tenant before another tenant is actually created.

In this example, the user interface 191 indicates that the second user has created an invitation list for their own tenant. When this occurs, the interface elements 192 can provide options in selectable elements 192 displayed to the second user. A first element 192A allows the second user to join the first tenant, e.g., Bob can join Alice's tenant. In this first option, if the second user has selected any other user identities to be members of their tenant, the computing device can allow the second user to invite those additional members to the first tenant, e.g., Bob can invite additional members to Alice's tenant. A second element 192B allows the second user to join the first tenant without inviting other members, e.g., Bob can join Alice's tenant alone. These first two options may allow Bob to join Alice's tenant and also cancel his own request to instantiate a separate tenant.

A third element 192 allows the second user to ignore the invitation sent from the first user and allows the second user to create their own separate tenant without joining the first tenant. For example, Bob may instantiate a second tenant 102B and not be a member of Alice's tenant. These examples are provided for illustrative purposes and are not to be construed as limiting. It can be appreciated that a number of options can be provided to the second user which may allow for any combination of actions allowing the second user to join the first user's tenant and/or creating another tenant.

Figure 2D:
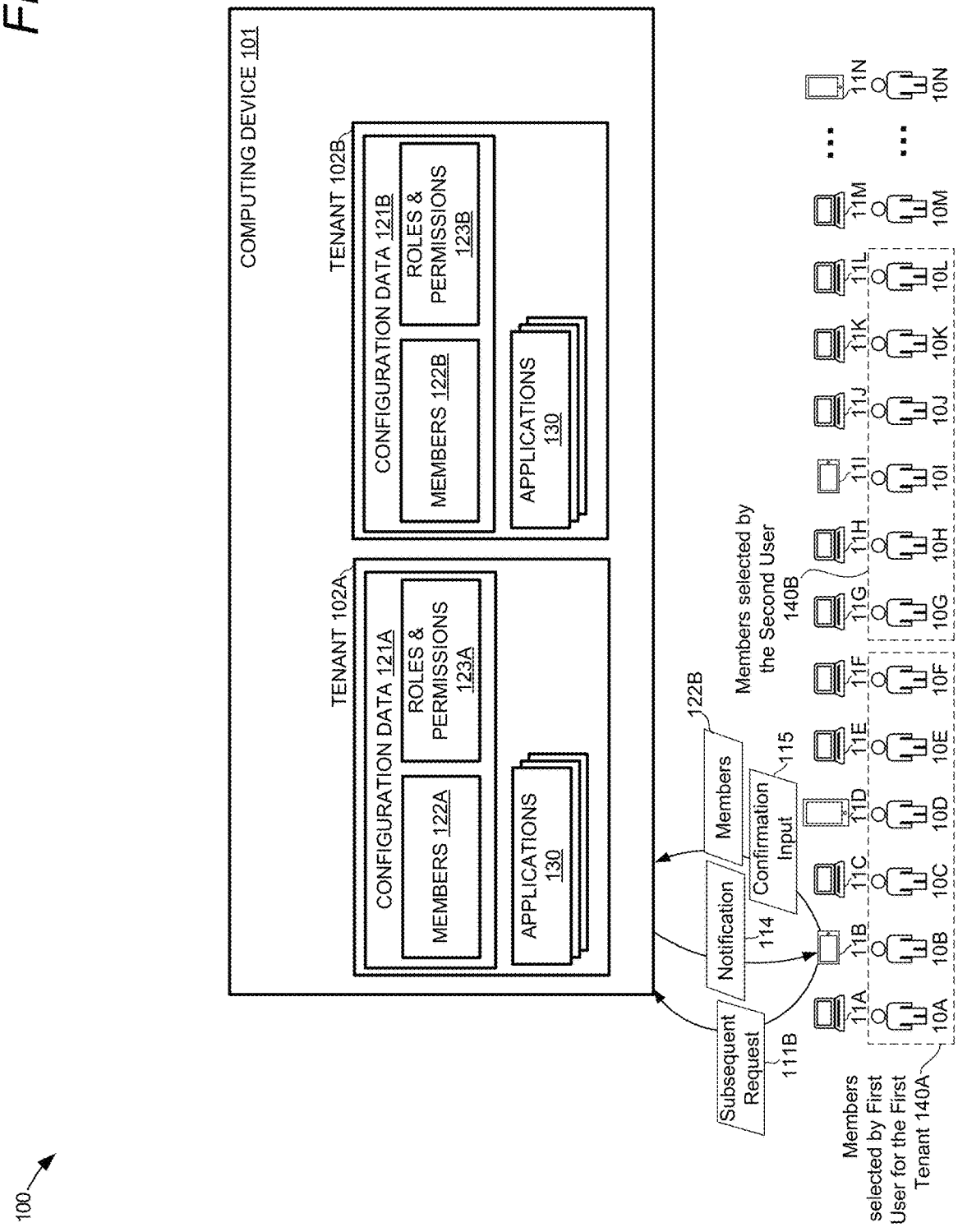
FIG. 2D shows aspects of configuration data that may be received in conjunction with a confirmation input indicating an acceptance of an invitation to join an established tenant.

As shown in FIG. 2D, once the second user has accepted the invitation, the device of the second user communicates a confirmation input 115 indicating that the second user has accepted the invitation to join the first tenant 102A. In response to the confirmation input 115, the device 101 can activate the roles and permissions for the second user. For example, once Bob has accepted the invitation to join Alice's tenant, the roles and permissions assigned by Alice can be activated for Bob. Bob and Alice can then be visible to one another within the first tenant 102A and share information using the permissions defined by Alice.

Also, shown in FIG. 2D, if the second user has selected other users, membership data 122B may be communicated to the device 101 for inclusion of those selected users in the membership data 122A of the first tenant. In addition, if the second user still desires to establish a second tenant, the second computing device may also provide a second request 111B causing the device 101 to create a second tenant 102B managed by the second user.

Once the members of a tenant are identified, the access permission for each member may be activated in response to one or more predetermined actions. In one embodiment, the permissions may be activated for each user once a particular invitee passes an authentication process and accepts their invitation. FIG. 2E illustrates an example of such an embodiment. In this example, the users are first registered in the membership data 122A as invitees. While registered as invitees, these users do not have access permissions for the first tenant. Access permissions are only granted to invitees after they perform an authentication process and accept their invitation. In this example, the third user 10C and the sixth user 10F provided a confirmation input 115 in response to a notification 114 and are thus granted access to the tenants according to the permission data 123A. In this example, given that the fourth user 10D and the fifth user 10E have not provided a confirmation input or create the tenant, the access permissions for these users are not activated.

In addition to the embodiments where users can select members of a tenant, the computing device 101 can also select members for a tenant using heuristic and/or machine learning techniques. Activity data, organizational data, or other contextual data can be used to determine how individuals can be selected for a particular tenant. For example, if Bob and Alice are teachers, the system may also select students for each class. In another example, if Alice is a team manager that has developers working substantively with Bob's team, those developers having a threshold level of communication may be selected for Alice's tenant. These examples are provided for illustrative purposes and is not to be construed as limiting. It can be appreciated that other techniques can be utilized for selecting users for a tenant or determining how two or more members lists can be combined.

Figure 3B:
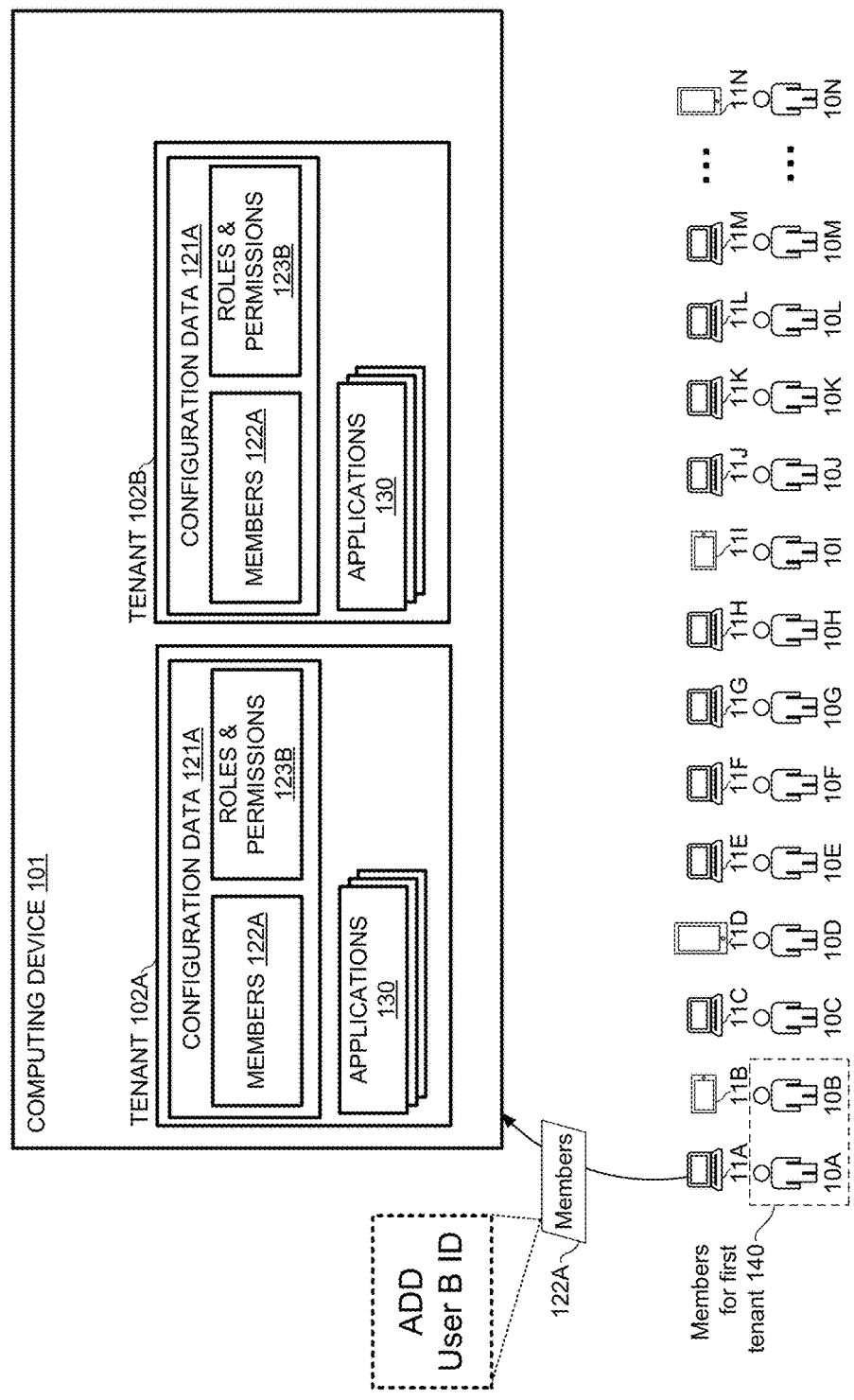
FIG. 3B shows aspects of membership data received from a first user to add a member list to a first tenant.
Figure 3C:
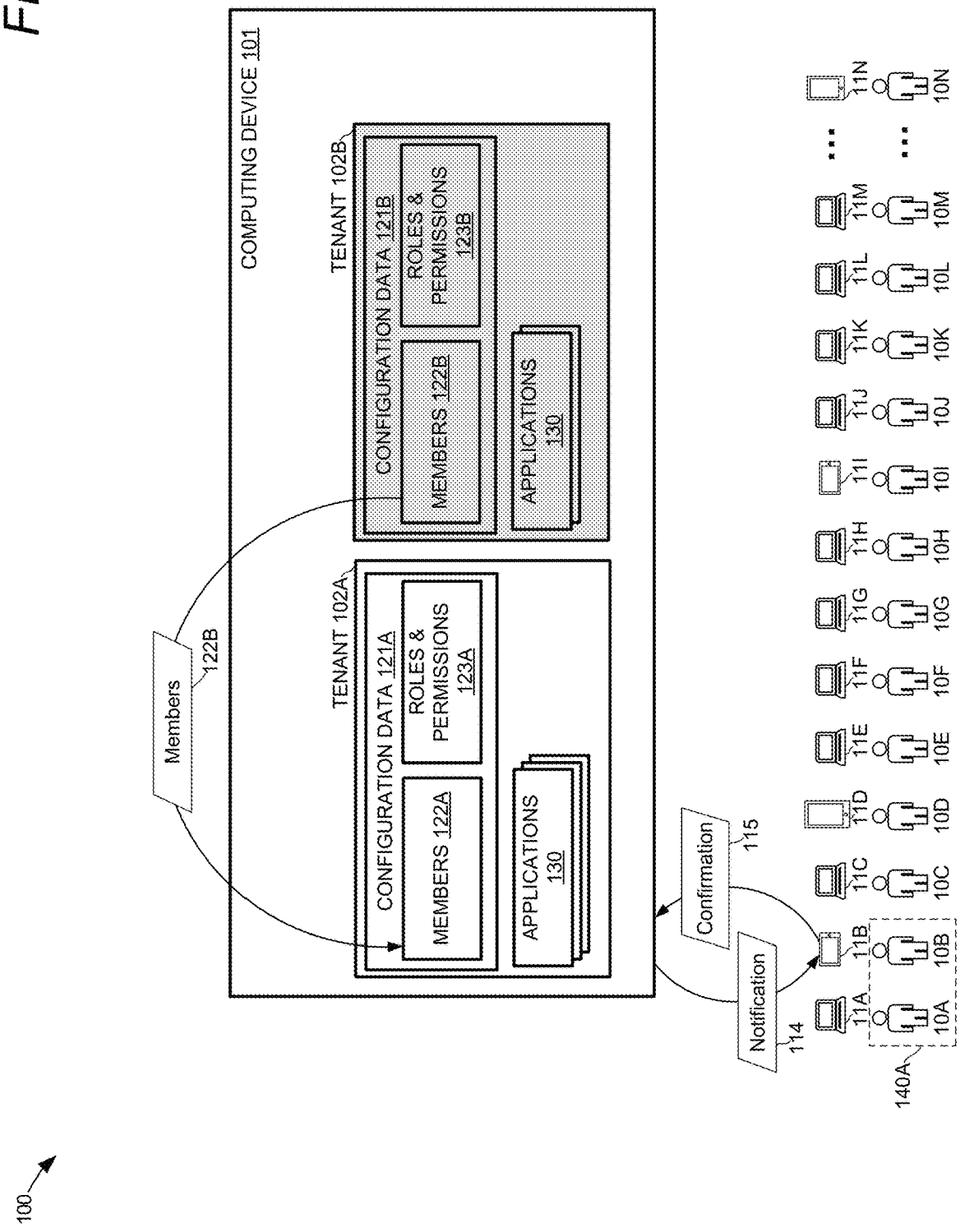
FIG. 3C shows aspects of a process for migrating a user to a tenant in response to accepting an invitation to join the tenant, the process involving the process of merging two member groups.

Referring now to FIGS. 3A-3C, a variation of the sign-up flow is shown and described below. This example shows how the sign-up flow accommodates a scenario where users create separate tenants and then subsequently invite one another to at least one of the existing tenants. As shown in FIG. 4A, the sign-up flow starts when both the first user and the second user send requests 111 to create two different tenants, the first tenant 102A and the second tenant 102B. Then, as shown in FIG. 3B, the first user sends member data 122A to the computing device to add the second user as a member of the first tenant. In response to receiving this member data for the first tenant, as shown in FIG. 3C, the computing device 101 may cause the display of an invitation 114 to the second user. Similar to the examples described above, the computing device 101 can require the second user to successfully complete one or more authentication verifications prior to having access to any details of the invitation.

Once the second user views the invitation 114 and provides a confirmation 115 indicating that the second user has accepted the invitation, the computing device 101 can activate permission for the second user to access the first tenant 102A. The confirmation 115 can also indicate that the second user has elected to remove the second tenant 102B. In response, the computing device 101 can remove the second tenant, as indicated by the shaded portions of FIG. 3C. In such an option, the confirmation 115 can also indicate that the second user has elected to bring members of the second tenant to the first tenant, as indicated by the transfer of the member data 122B. In such an embodiment, the members of the second tenant may adopt permissions that were established by the user managing the first tenant, e.g., members who join the first tenant from the second tenant all adopt roles and permissions from the first set of permission data 123A. Alternatively, the first user or the second user can provide instructions to allow the incoming members to keep at least a portion of the roles and permissions that were defined in the second set of permission data 123B.

Referring now to FIGS. 4-11, embodiments for automatically clustering users based on characteristics of requests to configure tenants is shown and described below. As summarized herein, request characteristics can include, but are not limited to, domain names associated with individual requests, network addresses associated with individual requests, a number of requests received within a predetermined time period, and entity names associated with individual requests. The following examples are provided for illustrative purposes and are not to be construed as limiting. It can be appreciated that any combination of these characteristics can be used to select individual members for a tenant.

In the following examples, a computing device 101 is optimized for mitigating the generation of forked tenants while enabling user-initiated requests to configure tenants of a multi-tenant service. The computing device 101 can receive a number of requests 111A-111N each configured to create individual tenants for each user 10A-10N attempting to sign-up with the multi-tenant service. Each request 111 can originate from a computing device 11A-11N each having a unique network address. In addition, each request 111 can be associated with a domain name. The domain name can be from an email address or other identifier of a user 10 sending a request 111. Instead of creating a separate tenant for each request 111, the system determines if at least one characteristic of the requests meets one or more criteria. If a specific group of requests each have at least one characteristic that meets one or more criteria, the system creates a single tenant 102 and designates each user associated with the specific group of requests as members of the tenant 102.

Referring now to FIG. 4, an example of a sign-up flow that determines a cluster of users based on an analysis of timing characteristics and address characteristics of incoming requests is show and described below. As shown in FIG. 4, a device can receive a number of requests from users 10A-10N engaging in a sign-up flow. The device then analyzes characteristics of the requests to select a group of users to be members 140 of a tenant 102 based on network addresses indicating the origin of individual requests and based on a rate in which requests are received from the users. In the charts of FIG. 4, if a count of a particular set of requests exceeds a count threshold within a time period 501, and if the network addresses indicating the origination of the particular set of requests are within a predetermined address range, users associated with the particular set of requests are selected to be members 140 of the tenant 102.

In some embodiments, a rate in which the requests are received can be monitored by the device 101. The device can then analyze network addresses of a select set of requests that were received during a period in which the request rate exceeds a rate threshold 503. In one illustrative example, the network address can be an IP address. In such embodiments, a range 502 may include an IP address range, e.g., 125.234.098.001 through 125.234.098.100. The system then selects users to be members 140 of a tenant 102 if the users are associated with requests that originated from addresses, e.g., IP addresses, that are within the predetermined address range 502, and if the users are associated with requests that are received during the period in which the request rate exceeded the rate threshold. This example is provided for illustrative purposes and is not to be construed as limiting. The techniques disclosed herein can utilize any suitable address range, any suitable type of address, and any suitable range or ranges.

In the example of FIG. 4, the request rate exceeds the rate threshold 503 for a time period 501. During that time period, requests from user 10D through user 10L are received. Thus, the addresses associated with requests 111D through 111L can be analyzed. In this example, the addresses associated with requests 111E through 111L from users 10E through 10L are within the predetermined address range 502. Since the addresses of requests 111E through 111L are within the predetermined address range 502 and since requests 111E through 111L are received while the request rate was above the request rate threshold 503, users 10E through 10L are selected as members 140 for the tenant 102. However, since the request 111D from user 10D is associated with an IP address that outside of the range 502, user 10D is not select as a member.

In the embodiments disclosed herein, the users that are selected as members of a tenant can be required to successfully perform an authentication process. Once authenticated, an invitee can be allowed to view details of the invitation and be allowed to provide an acceptance to the invitation. The device can then grant access permissions of each user responding to an invitation. Alternatively, the users that are selected as members of a tenant can be automatically added to a tenant roster and automatically granted access rights in response to the selection.

Figure 5:
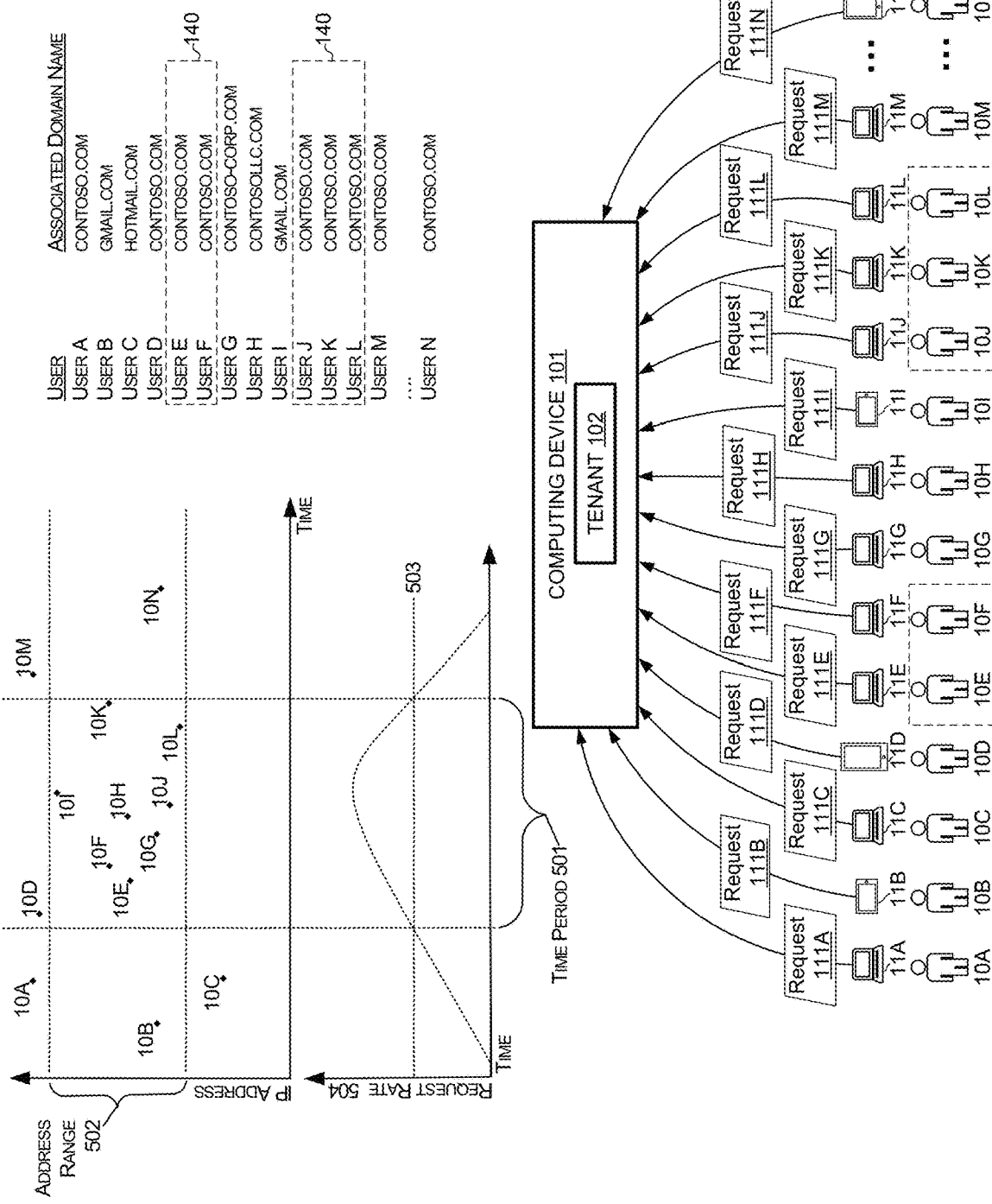
FIG. 5 is a block diagram of a system for utilizing the network effect of end-user viral adoption of services and applications by clustering users to a tenant based on network addresses associated with requests to create new tenants, a rate in which the requests are received, and a domain name matching process.

FIG. 5 shows an example where users are selected to be members 140 of a single tenant 102 based on a match between domain names associated with individual requests, a rate in which requests are received from the users, and network addresses associated with the individual requests. For example, the computing device 101 can analyze the requests from each user 10A-10N seeking to generate new tenants. If the number of requests exceeds a threshold within a time period 501, and if the network addresses associated with those requests are within a predetermined address range 502, and if domain names associated with each request all match, users associated with the requests are selected to be members 140 of the tenant 102.

The device 101 can monitor a rate in which the requests are received. The device can then analyze a network address, e.g., an internet protocol (IP) address, of each request that is received during a period in which the request rate exceeds a rate threshold 503. Users associated with the requests that originate from IP addresses that are within a predetermined address range 502 are then selected to be members 140 of the tenant 102.

In the example of FIG. 5, the request rate 504 exceeds the request rate threshold 503 for a time period 501. During that time period, requests from user 10D through user 10L are received. Thus, the network addresses and domain names associated with requests 111D through 111L can be analyzed. In this example, the addresses associated with requests 111E through 111L from users 10E through 10L are within the predetermined address range 502. In addition, the domain names of identities associated with requests 111E, 111F and 111J-111L are the same. Given that the domain names of identities associated with requests 111E, 111F and 111J-111L are the same, and that these requests were received within the time period in which the rate was above a threshold, and that the associated addresses are within the predetermined range, user 10E, user 10F, user 10J, user 10K and user 10L are selected as members of the tenant 102. Invitations can then be sent to the selected members. Access rights can also be granted for the selected members in response to receiving a verification that the selected members perform one or more required actions, e.g., passing an authentication process and/or accepting an invitation.

Figure 6:
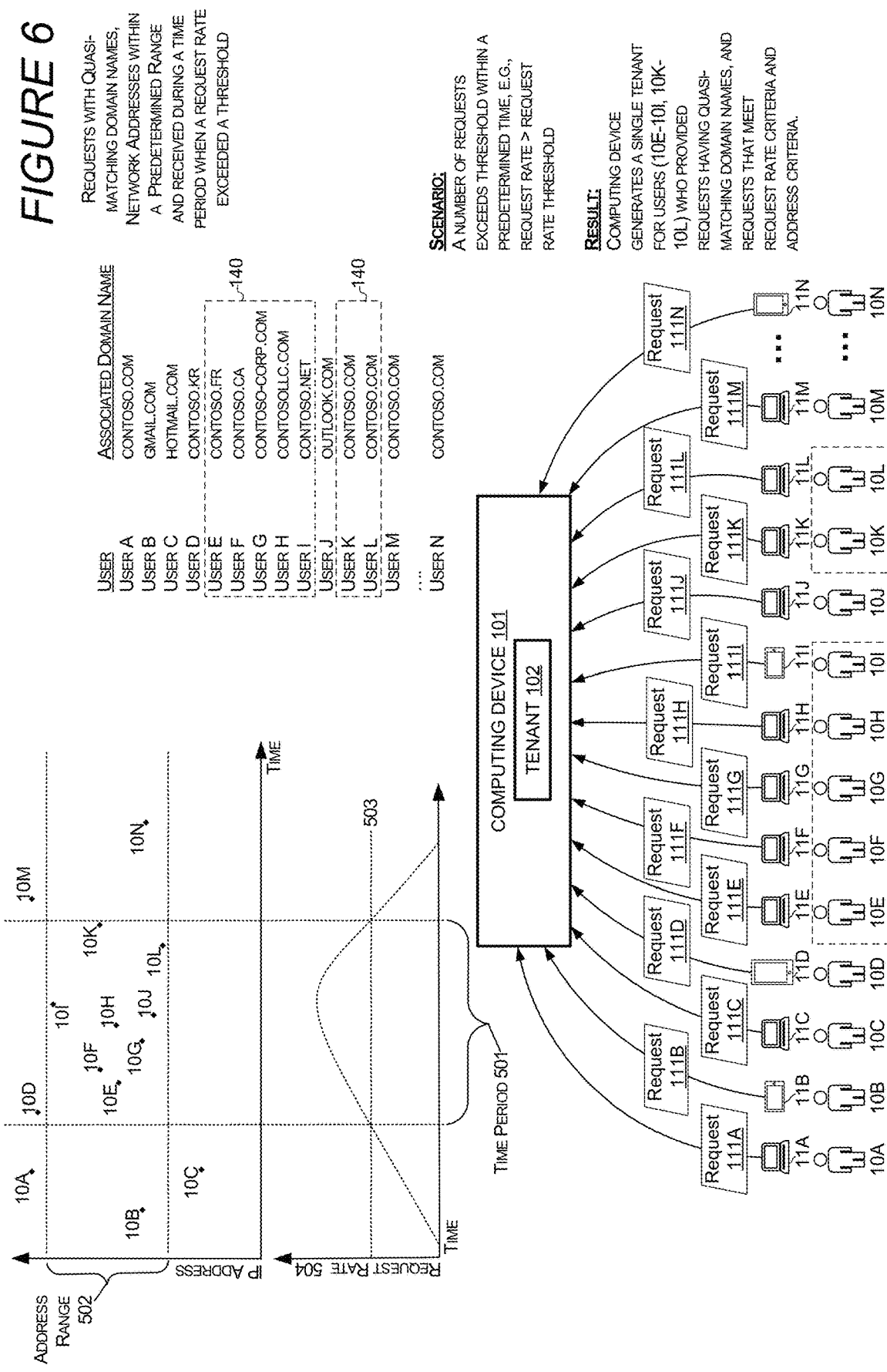
FIG. 6 is a block diagram of a system for utilizing the network effect of end-user viral adoption of services and applications by clustering users to a tenant based on an analysis of network addresses associated with requests to create new tenants, a rate in which the requests are received, and a domain name matching process.

The example of FIG. 6 is similar to the example of FIG. 5 except the domain name matching is based on a quasi-matching process. In this embodiment, the computing device 101 can analyze the requests from each user 10A-10N seeking to generate new tenants. If the number of requests exceeds a threshold within a time period 501 for a particular set of requests, and if the network addresses associated with the particular set of requests are within a predetermined address range 502, and if domain names associated with each request are at least partially alike, users associated with the particular set of requests are selected to be members 140 of the tenant 102.

In this example, a rate in which the requests are received exceeds the request rate threshold 503 for a time period 501. During that time period, requests from user 10D through user 10L are received. Thus, the addresses and domain names associated with requests 111D through 111L can be analyzed. In this example, the addresses associated with requests 111E through 111L from users 10E through 10L are within the predetermined address range 502. In addition, the domain names of identities associated with requests 111E-111I and 111K-111L have similar portions. Specifically, there is a specific set of requests each associated with domain names having at least a common word, "contoso." Given that the domain names associated with requests 111E-111I and 111K-111L have at least a common portion, and that these requests were received within the time period in which the request rate was above a threshold (e.g., there was a threshold number of requests within a time period 501), and that the associated addresses are within the predetermined range, users 10E-10I and 10K-10L are selected as members 140 of the tenant 102. Invitations can then be sent to the selected members. Access rights can also be granted for the selected members in response to receiving a verification that the selected members perform one or more required actions, e.g., passing an authentication process and/or accepting an invitation.

Figure 7:
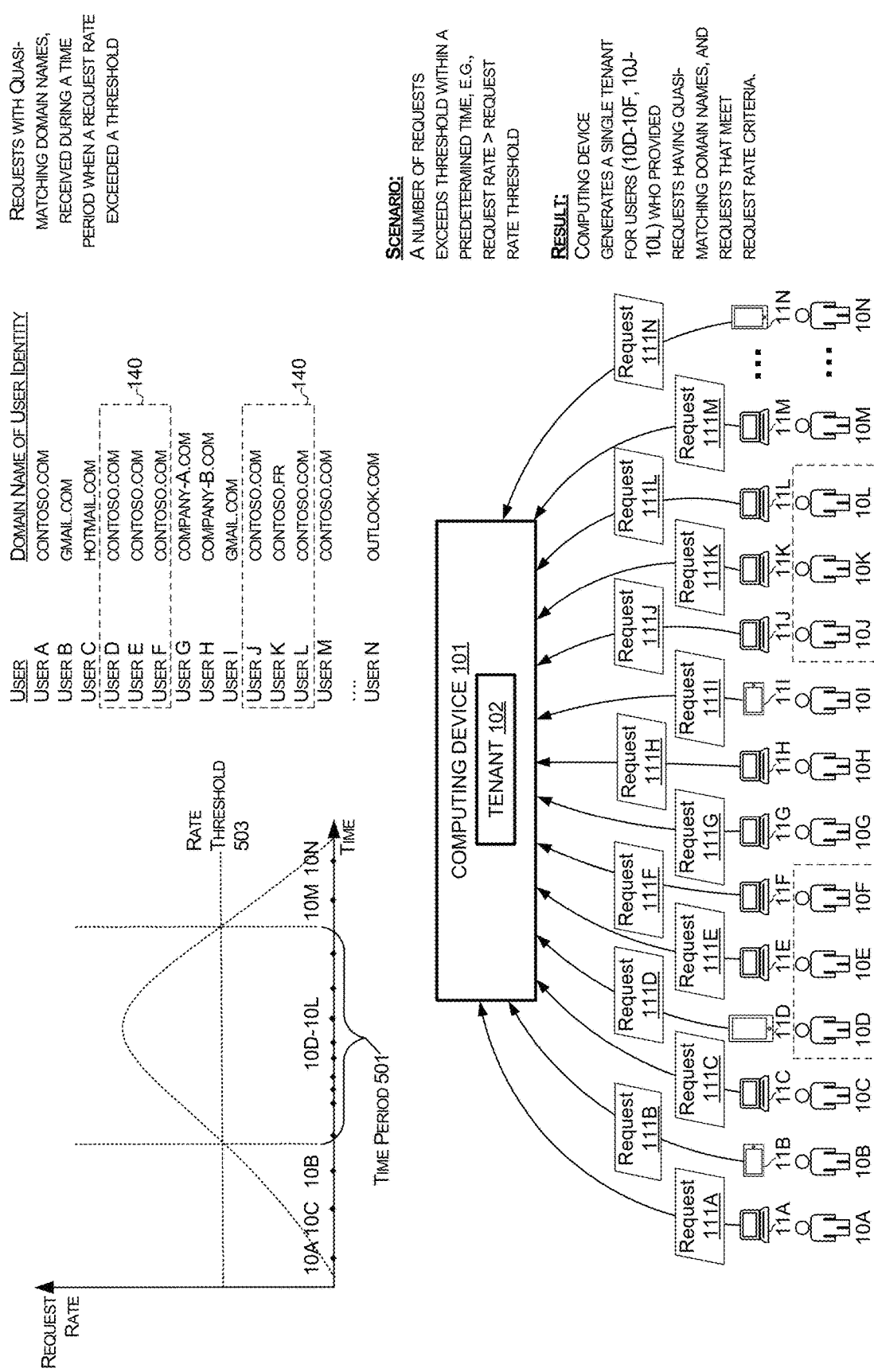
FIG. 7 is a block diagram of a system for utilizing the network effect of end-user viral adoption of services and applications by clustering users to a tenant based on a rate in which the requests to create new tenants are received and a domain name comparison process.

FIG. 7 shows an example where the device selects users to be members 140 of a single tenant 102 based on a match or a quasi-match between domain names associated with individual requests and a rate in which requests are received from the users. This embodiment is similar to the process flow of FIG. 6 except this embodiment does not involve the analysis of the address range. For example, the computing device 101 can analyze the requests from each user 10A-10N seeking to generate new tenants. If the number of requests exceeds a threshold within a time period 501, and if domain names associated with each request have at least a matching portion, users associated with the requests meeting such criteria are selected to be members 140 of the tenant 102.

In the example of FIG. 7, the request rate exceeds a rate threshold 503 for a time period 501. During that time period, requests from user 10D through user 10L are received. Thus, the domain names associated with requests 111D through 111L can be analyzed. In this example, of those requests that were received during the time period, the domain names associated with requests 111D-111F and 111J-111L all share at least a matching portion. Specifically, requests 111D-111F and 111J-111L all share an association with at least the word "contoso." Given that the domain names associated with requests 111D-111F and 111J-111L have at least a matching portion, and that these requests were received within the time period in which the rate was above a threshold, users 10D-10F and 10J-10L are selected as members of the tenant 102. Invitations can then be sent to the selected members. Access rights can also be granted for the selected members in response to receiving a verification that the selected members perform one or more required actions, e.g., passing an authentication process and/or accepting an invitation.

Figure 8:
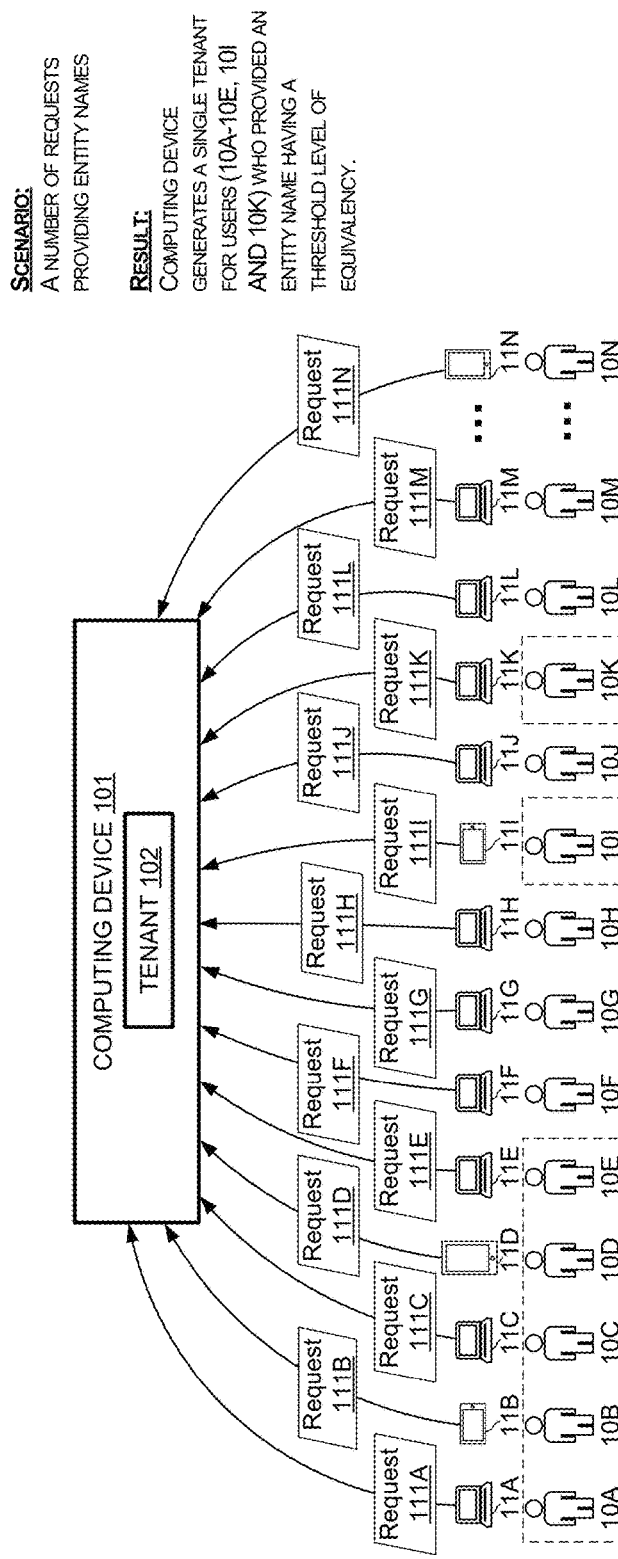
FIG. 8 is a block diagram of a system for utilizing the network effect of end-user viral adoption of services and applications by clustering users to a tenant based on a matching process for entity names associated with requests to create new tenants.

FIG. 8 shows an example where the device selects users to be members 140 of a single tenant 102 based on a match or a quasi-match between entity names associated with individual requests. An entity name can be a name of a company, school, club, or a name of group of individuals. For example, as shown in FIG. 2B, when providing input data for a request, a user can enter an entity name, such as a company name. The computing device 101 can then analyze entity names associated with requests from each user 10A-10N seeking to generate new tenants. If the entity names associated with each request have at least a matching portion, or have at least a threshold level of equivalency, users associated with the requests meeting such criteria are selected to be members 140 of the tenant 102.

In some configurations, the threshold level of equivalence can be determined by the use of any suitable text matching process. For instance, an equivalency score can be generated for two or more entity names that are analyzed together. If the equivalency score of particular group of entity names exceeds an equivalency threshold, users associated with such requests can be selected to be members of the tenant. The equivalency threshold can vary to require exact matches between names to a level where the system can interpret an intent of similar words that are not spelled the same but are phonetically similar. Thus, even though some users may spell a company name differently, include a different prefix or suffix, or inadvertently use upper-case or lower-case letters differently, the system may still select such users to be members of a single tenant.

In the example of FIG. 8, the entity names associated with requests 111A through 111N can be analyzed. In this example, a policy causes the device to determine that two or more entity names have a threshold level of equivalency when they include the words "contoso" and "incorporated" and variations thereof. As shown in FIG. 8, the entity names associated with requests 111A-111E, 111I, and 111K meet this threshold level of equivalency. Specifically, requests 111A-111E, 111I, and 111K all share at least the word "contoso" and a variation of the word "incorporated." Given that the entity names associated with requests 111A-111E, 111I, and 111K have the threshold level of equivalency, users 10A-10E, 10I, and 10K are selected as members of the tenant 102. Invitations can then be sent to the selected members. Access rights can also be granted for the selected members in response to receiving a verification that the selected members perform one or more required actions, e.g., passing an authentication process and/or accepting an invitation.

Figure 9:
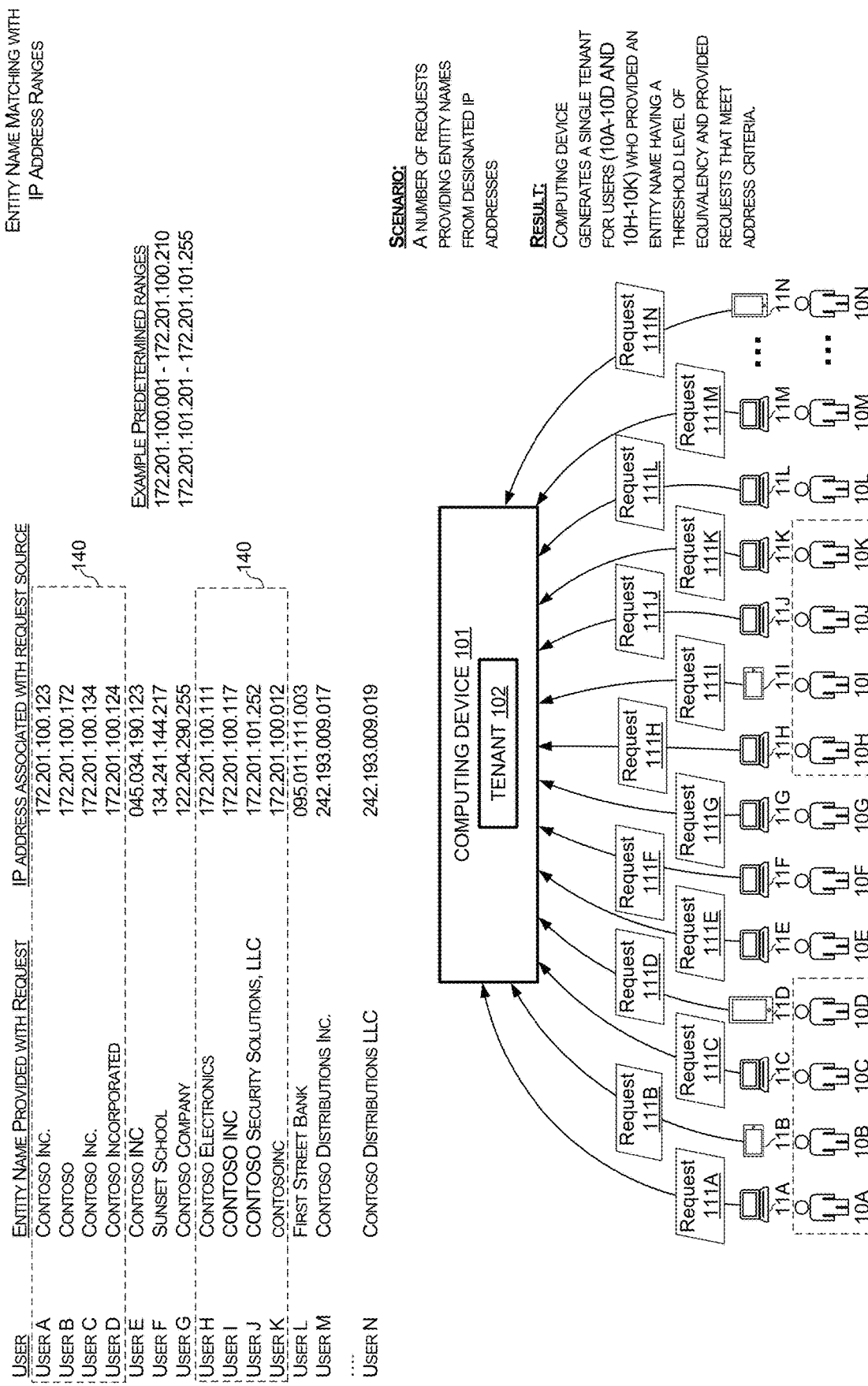
FIG. 9 is a block diagram of a system for utilizing the network effect of end-user viral adoption of services and applications by clustering users to a tenant based on a matching process for entity names associated with requests to create new tenants and a process for analyzing network addresses associated with the requests.

FIG. 9 shows an example where the device selects users to be members 140 of a single tenant 102 based on a match or a quasi-match between entity names associated with individual requests and network addresses indicating the origin of individual requests. In this example, the device analyzes the network addresses of the received requests and identifies a select set of requests that are received during a period in which a request rate exceeds a threshold 503. In one illustrative example, the network address can be an IP address. In such an implementation, one or more ranges 502 can be used. Specific to the example of FIG. 9, requests that originated from devices having IP addresses within the ranges 172.201.100.001-172.201.100.210 and 172.201.101.201-172.201.101.255 meet the address criteria defined in this example. The device 101 then analyzes entity names associated with the requests and generates equivalency scores for various requests. The system then selects a specific set of users to be members 140 of a tenant 102 if the users are associated with a specific set of requests that originated from addresses, e.g., IP addresses, that are within the predetermined address range 502 and if the specific set of requests all have entity names that have a threshold level of equivalency.

In the example of FIG. 9, the entity names associated with requests 111A through 111N can be analyzed. In this example, a policy causes the device to determine that two or more entity names have a threshold level of equivalency when they include the word "contoso" and variations thereof, e.g., that the domain names have at least a matching portion. Specifically, requests 111A-111E, 111G-111K, and 111M-111N all share at least the word "contoso." The network addresses of the requests are also analyzed. Given that requests 111A-111D and 111H-111K have a threshold level of equivalency with respect to an entity name and since these requests originated from an address that is within the predetermined range, users 10A-10D and 10H-10K are selected as members of the tenant 102. This example shows how users are excluded from the member list when they are working from a computer that is operating from an unauthorized address.

Figure 10:
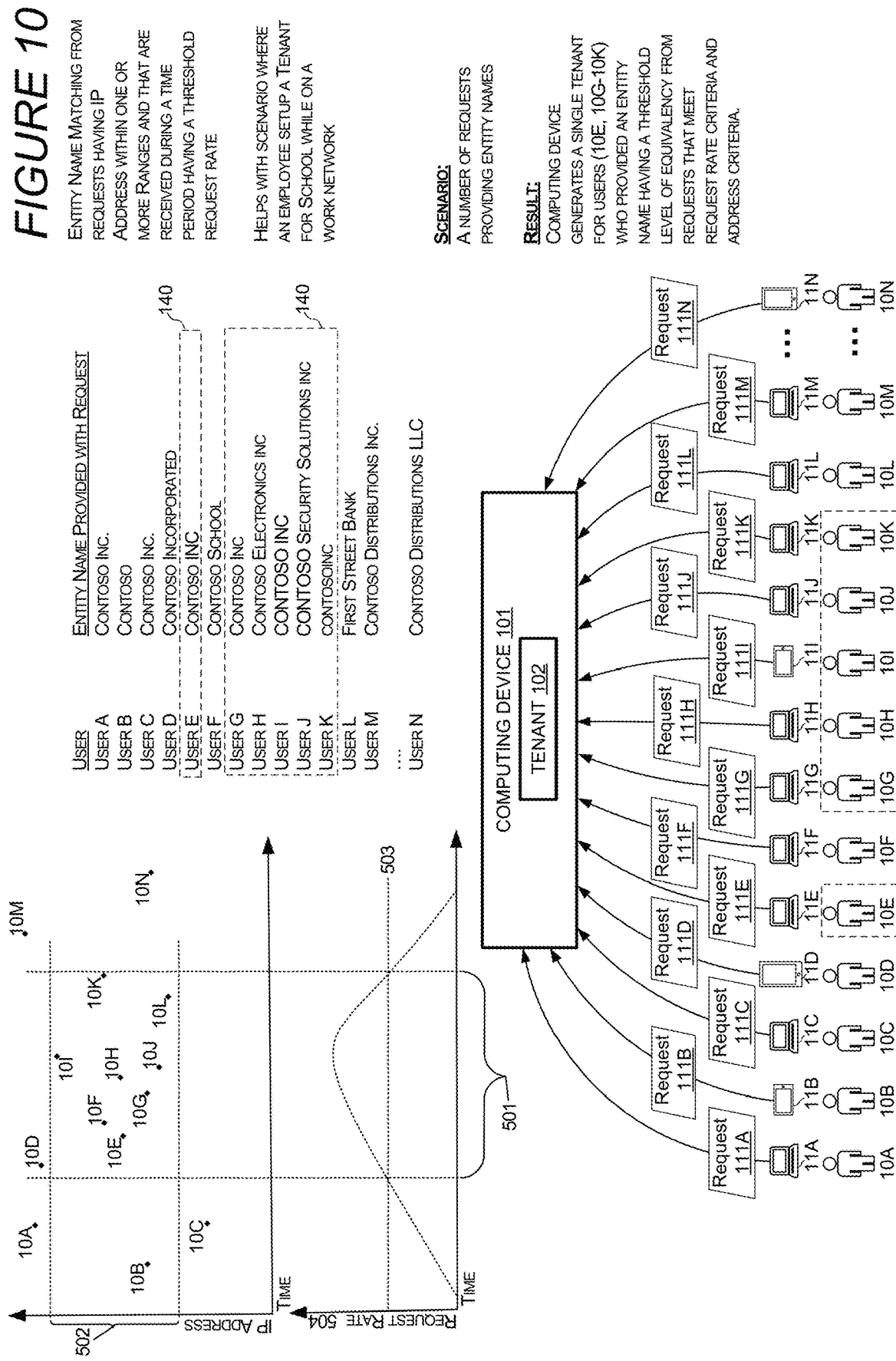
FIG. 10 is a block diagram of a system for utilizing the network effect of end-user viral adoption of services and applications by clustering users to a tenant based on a matching process for entity names associated with requests to create new tenants, a process for analyzing network addresses associated with the requests, and a rate in which the requests are received.

FIG. 10 shows an example where the device selects users to be members 140 of a single tenant 102 based on (1) a match or a quasi-match between entity names associated with individual requests, (2) network addresses indicating the origin of individual requests, and (3) a rate in which request are received. In this example, the computing device 101 can analyze entity names associated with requests from each user 10A-10N seeking to generate new tenants. The system can then generate an equivalency score for any set of the requests based on any suitable text matching techniques. The device also analyzes the network addresses of the requests that are received during a time period 501 where a request rate exceeds a rate threshold 503. The system selects a specific set of users to be members 140 of a tenant 102 if the users are associated with a specific set of requests have entity names that have a threshold level of equivalency, and if the specific set of requests are received within a time period 501 when a request rate 504 is above a threshold 503, and if the specific set of requests originated from addresses, e.g., IP addresses, that are within the predetermined address range 502. As described above, the threshold level of equivalency can be determined by any suitable matching techniques.

In the example of FIG. 10, the entity names associated with requests 111A through 111N can be analyzed. In this example, a policy causes the device to determine that two or more entity names have a threshold level of equivalency when they include the words "contoso" and "incorporated" or variations thereof, e.g., variations of capital letters and misspellings involving a threshold number of letters are still considered to be equivalent. Specifically, requests 111A-111K and 111M-111N, all share at least the words "contoso" and "incorporated" or abbreviations thereof. The network addresses of the requests received within the time period 501 are also analyzed. Since requests 111E and 111G-111K have a threshold level of equivalency with respect to an entity name, and since these requests were received during the time period 501 when the request rate 504 was above a threshold, and since these requests originated from addresses that are within the predetermined range, users 10E and 10G-10K are selected as members of the tenant 102. Invitations can be sent to the selected members, or optionally, the members can be automatically granted access rights to the tenant.

Figure 11:
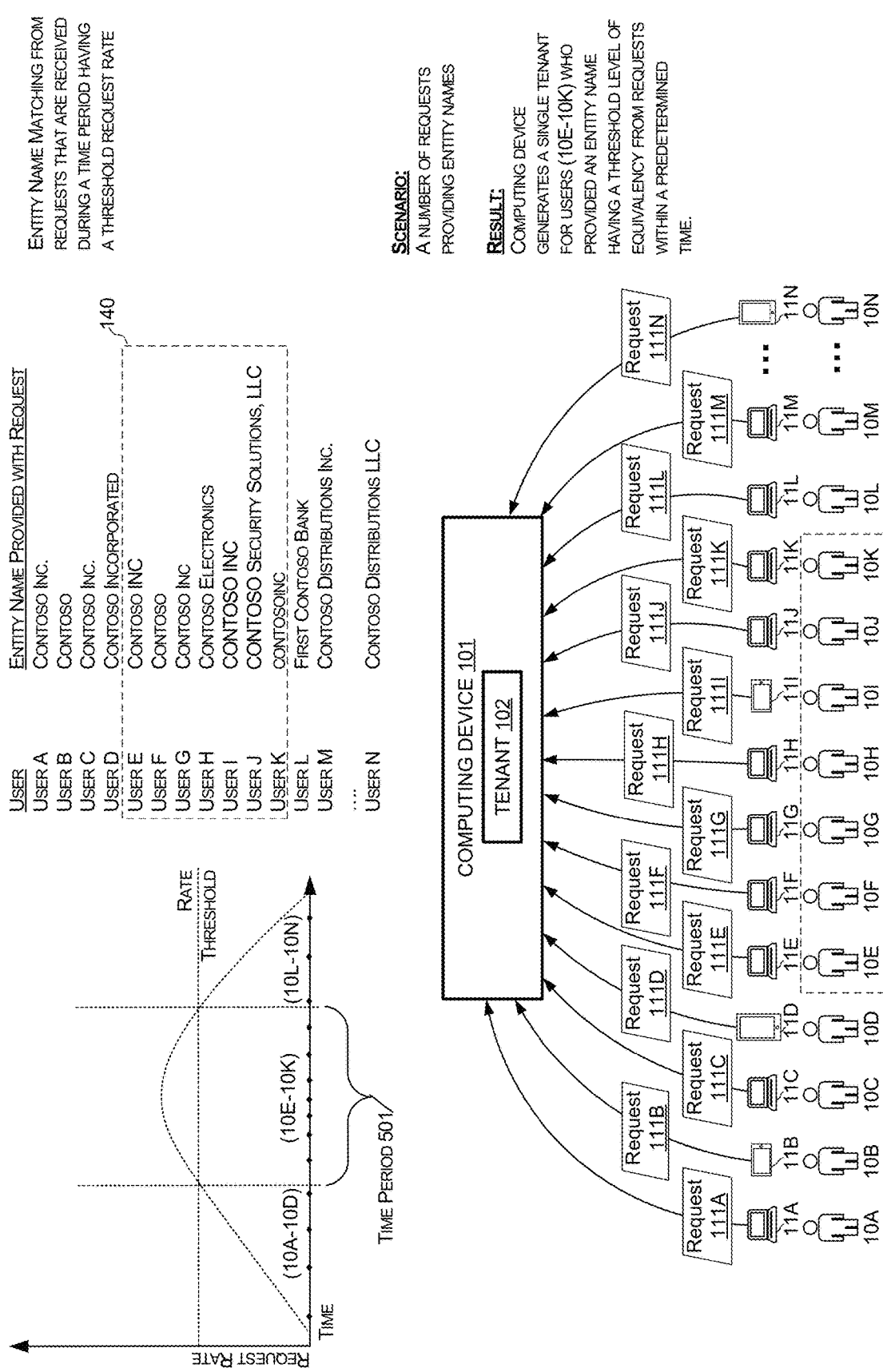
FIG. 11 is a block diagram of a system for utilizing the network effect of end-user viral adoption of services and applications by clustering users to a tenant based on a matching process for entity names associated with requests to create new tenants and a rate in which the requests are received.

FIG. 11 shows an example where the device selects users to be members 140 of a single tenant 102 based on a match or a quasi-match between entity names associated with individual requests and a rate in which request are received. In this example, the computing device 101 can analyze entity names associated with requests from each user 10A-10N seeking to generate new tenants. The system can generate an equivalency score for any set of the requests based on any suitable text matching techniques. The device also analyzes a rate in which the requests are received and determines if a certain set of requests are received during a period in which the request rate exceeds a rate threshold 503. The system then selects a specific set of users to be members 140 of a tenant 102 if the users are associated with a specific set of requests have entity names that have a threshold level of equivalency and if the specific set of requests are received within a time period 501 when the request rate 504 is above a threshold 503.

In the example of FIG. 11, the entity names associated with requests 111A through 111N can be analyzed. In this example, a policy causes the device to determine that two or more entity names have a threshold level of equivalency when they include the word "contoso" and variations thereof, e.g., that the domain names have at least a matching portion. Specifically, requests 111A-111N, all share at least the word "contoso." The system also monitors the rate in which the requests are received. In this example, it is determined that requests 111E through 111K are received during a time period 501 when a request rate 504 was above a threshold. Since requests 111E through 111K are received during the time period 501 when the request rate 504 was above a threshold and since these requests are also associated with entity names that have a threshold level of equivalency, users 10E-10K are selected as members of the tenant 102. Invitations and/or permissions to access the tenant can be sent to these selected members.

As summarized above, any combination of the factors disclosed herein can be utilized in the techniques disclosed herein. For example, embodiments involving membership data that is provided in association with a request can be utilized in any of the embodiments disclosed with respect to FIGS. 5 through 12. For example, consider a scenario where a first user submits a request to configure a tenant and also provides the names of other users, e.g., users 10B-10N. The system can utilize any of the other factors including the IP address, a domain name, or any other contextual data including an entity name, to filter the members requested by the first user. Thus, the other users may only receive an invitation if the first user invites them, and/or if they have a domain or entity name that matches the first user, and/or if they have a computer within an IP address range, and/or if they submit a request within a predetermine period of time or a time period during which a request rate for those users exceeds a threshold.

Other suitable variations to the techniques disclosed herein can apply to the described embodiments as well. For instance, although some examples described herein involve a request rate that considers a count of requests received within a time period, it can be appreciated that the request rate and/or a request rate threshold can be based on requests from particular sources. For example, a request rate may be measured based on requests coming from a particular set of IP addresses. In addition, the time period 501 can also be a predetermined time period. For instance, if a company makes an announcement about an event, the device can be configured to measure a request rate during a predetermined time period after the announcement, e.g., within hours, days or weeks of an announcement. Along with using any other criteria defined herein, users associated with requests received in that predetermined time period can be selected as members of a single tenant.

Figure 12:
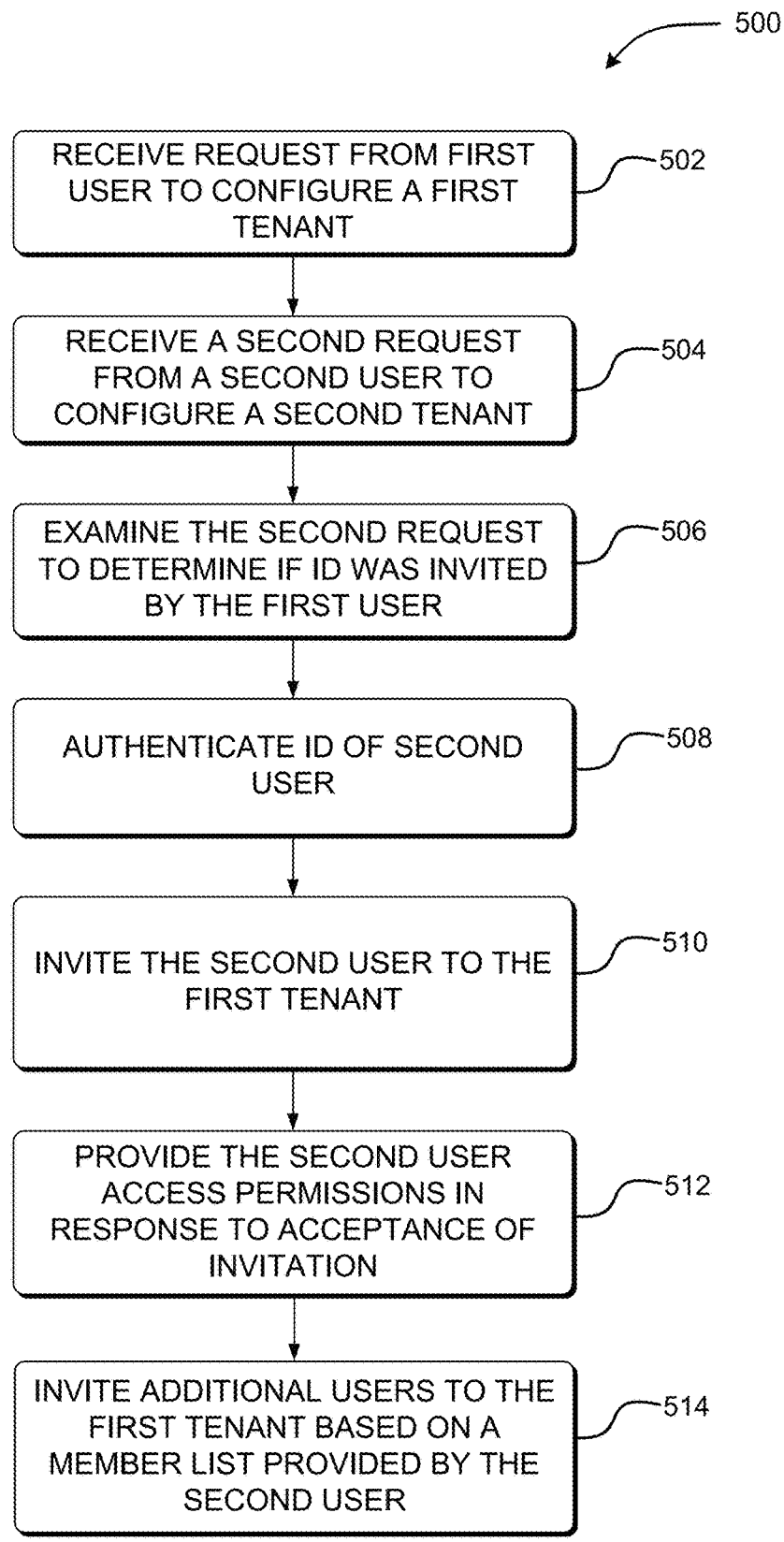
FIG. 12 is a flow diagram showing aspects of a routine for utilizing the network effect of end-user viral adoption of services and applications by clustering users based on membership data received by one or more users.
Figure 13:
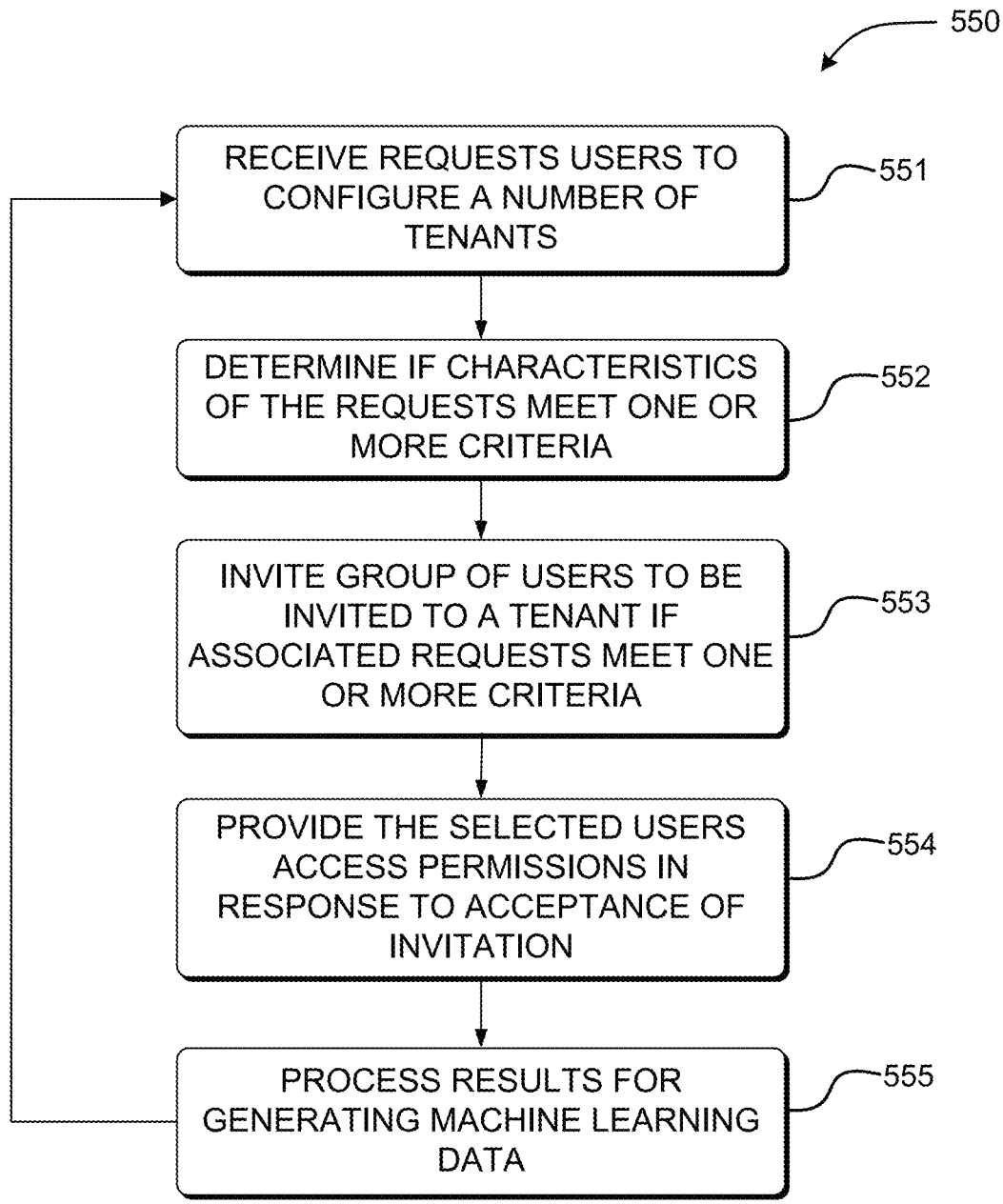
FIG. 13 is a flow diagram showing aspects of a routine for utilizing the network effect of end-user viral adoption of services and applications by clustering users based on characteristics of requests to configure new tenants.

Turning now to FIG. 12 and FIG. 13, example routines for automatically clustering users based on characteristics of requests to configure tenants are shown and described below. FIG. 12 shows a routine for automatically clustering users based on identities provided by a user and FIG. 13 shows a routine for automatically clustering users based on characteristics of requests for creating tenants. These routines can be utilized separately or in combination in any order. It should be understood that the operations of the methods disclosed herein are not presented in any particular order and that performance of some or all of the operations in an alternative order(s) is possible and is contemplated. For instance, in the example of FIG. 7, although the description of that example first analyzes the request rate to determine a subset of requests that meet criteria with respect to the timing of the requests, then analyzes the of domain names of the subset of requests, it can be appreciated that the process for any of the embodiments can be done in another order. For instance, the domain names can be analyzed to determine a subset of requests that meet criteria with respect to the domain names, then analyzes the of timing of that subset of requests. The operations have been presented in the demonstrated order for ease of description and illustration.

Operations may be rearranged, added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the example routines are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the management engine 134 for performing the techniques disclosed herein, it can be appreciated that the operations of the example routines may be also implemented in many other ways. For example, the example routines may be implemented, at least in part, by a processor of another remote computer or a local computer. In addition, one or more of the operations of the example routines may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 12, a routine 500 for automatically clustering users based on identities provided by a user is shown and described. The routine begins at operation 502 where the management engine 134 receives a first request to configure a first tenant to be managed by a first user. For illustrative purposes, a request to configure a tenant can include, a request to generate a new tenant, a request to modify a tenant, a request to add users to a tenant, a request to sign-up as a member for a tenant, or a combination there of. The request can include any type of configuration data for a tenant including identities of computer users to be invited as members of the tenant. The request may also include data defining roles and permissions for each invitee, definitions for groups associated with each invitee, and access rights for applications shared to members of the tenant.

Next, at operation 504, the management engine 134 receives a second request to configure a second tenant to be managed by a second user. This request can also include any type of configuration data for a tenant including identities of computer users to be invited as members of the tenant. The request may also include data defining roles and permissions for each invitee, definitions for groups associated with each invitee, and access rights for applications shared to members of the tenant. The first and second requests can each include an identity of a user, such as an email address with a domain name. Each request can also provide an indication of a source of the request, such as a network address of a computer that was used to send the request.

At operation 506, the management engine 134 analyzes the second request to determine if the first user included the second user to be a member of the first user. In one illustrative example, the management engine can analyze the second request to determine if an identifier of the second user was included in the configuration data sent by the first user.

At operation 508, in response to determining that the identifier of the second user was included in the configuration data sent by the first user, the management engine can require the second user to authenticate their identifier. In one illustrative example, a message can be sent to the second user requiring the second user to verify their identity.

At operation 510, in response to detecting a successful verification of the second user's identity, the management engine can send an invitation to the second user to become a member of the first tenant. In one illustrative example, the invitation can be in the form of an email sent to the second user. In another example, the invitation can be provided in a user interface that is displayed to the second user for configuring the second tenant. The invitation can provide a number of different options for allowing the second user to join the first tenant and/or creating their own tenant.

At operation 512, in response to receiving a confirmation that the second user has accepted the invitation from the first user, the management engine provides access permissions to the second user. The access permissions can be based on permissions established by the first user or the second user.

At operation 514, the management engine can also send invitations to other users that were identified by the second user. This operation may be performed in response to each invitee passing an authentication procedure. Access permissions to the first tenant for each invitee can be activated once the first user approves the invitation and/or after each invitee accepts the invitation.

In some embodiments, two or more tenants may be established by two different users who do not refer to each other as members of a particular tenant. For instance, a first user may start a first tenant without inviting a second user. After the second user generates a tenant, the first user may invite the second user. The system may send an invitation to the second user in response to receiving configuration data specifying the second user as a member of the first tenant managed by the first user, and after the generation of the first tenant and after the generation of the second tenant initiated by the second user. The system may then grant access permissions of the first tenant to an identifier of the second user giving the second user an ability to see users within the first tenant. The system may also close the second tenant managed by the second user, e.g., delete or disable an instance of the second tenant and delete or deactivate all configuration data of the second tenant to save resources and to mitigate the instances of forked tenants of users who should to work together.

With reference to FIG. 13, a routine 550 for automatically clustering users based on characteristics of requests to configure tenants is shown and described below. As summarized herein, request characteristics can include, but are not limited to, domain names associated with individual requests, network addresses associated with individual requests, a number of requests received within a predetermined time period, and entity names associated with individual requests. The following examples are provided for illustrative purposes and are not to be construed as limiting. It can be appreciated that any combination of these characteristics can be used to select individual members for a tenant.

The routine 550 begins at operation 551 where the management engine 134 receives a number of requests to configure a number of tenants. For illustrative purposes, a request to configure a tenant can include, a request to generate a new tenant, a request to modify a tenant, a request to add users to a tenant, a request to sign-up as a member for a tenant, or a combination there of. The request can include any type of configuration data for a tenant including identities of computer users to be invited as members of the tenant. The request may also include data defining roles and permissions for each invitee, definitions for groups associated with each invitee, and access rights for applications shared to members of the tenant.

At operation 552, the management engine 134 examines the requests to determine if a set of requests meet one or more criteria. The criteria can be based on any combination of characteristics, such as, but not limited to, domain names associated with individual requests, network addresses associated with individual requests, a number of requests received within a predetermined time period, and entity names associated with individual requests. In some embodiments, the criteria can define a request rate threshold and determine if a rate of incoming requests exceeds the rate threshold for a period of time. In some embodiments, the criteria can define an address range and determine if addresses of incoming requests are within the address range. In some embodiments, the criteria can define policies on how domain names and/or entity names should be analyzed. A set of requests can meet one or more criteria when associated domain names and/or entity names have a threshold level of equivalency. Any of the combinations of criteria may be used to determine a group of users.

At operation 553, the management engine can send invitations to the users selected to become members of a tenant. In some embodiments, the invitation can be sent in response to the detection that the users have successfully passed a verification process. In one illustrative example, the invitation can be in the form of an email sent to the selected users. In another example, the invitations can be provided in a user interface that is displayed to the selected users. The invitation can provide a number of different options for allowing the selected users to join the first tenant and/or creating their own tenant. For instance, the selected users can each view a user interface such as the user interface shown in FIG. 2C.

At operation 554, in response to receiving a confirmation that the selected users have accepted the invitations, the management engine provides access permissions to each selected user that accepts the invitations. The access permissions can be based on permissions established by any one of the selected users. In some configurations, the permissions may be predetermined based on a size of the group and the types of activities they are engaged in.

At operation 555, the management engine can process results from one or more user responses for generating machine learning data to be used in future iterations of the routine 550. For instance, if a user has a pattern of rejecting one or more invitations from a particular pool of users, the system may remove that user from future member lists that are generated by that pool of users. In another example, if members of a tenant are selected and later a majority of those members vote to remove a particular user, that particular users may be filtered from future iterations of the routine. The filtering can be done in a number of ways. For instance, if a user is removed from a member list or rejects the invitation, the system may change the address ranges or other criteria to avoid selecting that person in the future. In addition, rate thresholds can be adjusted if a selected group of users has too many false positives or too many false negatives. As shown, the routine 550 can return to operation 551 to repeat the routine using the any adjusted thresholds, criteria, etc.

Figure 14:
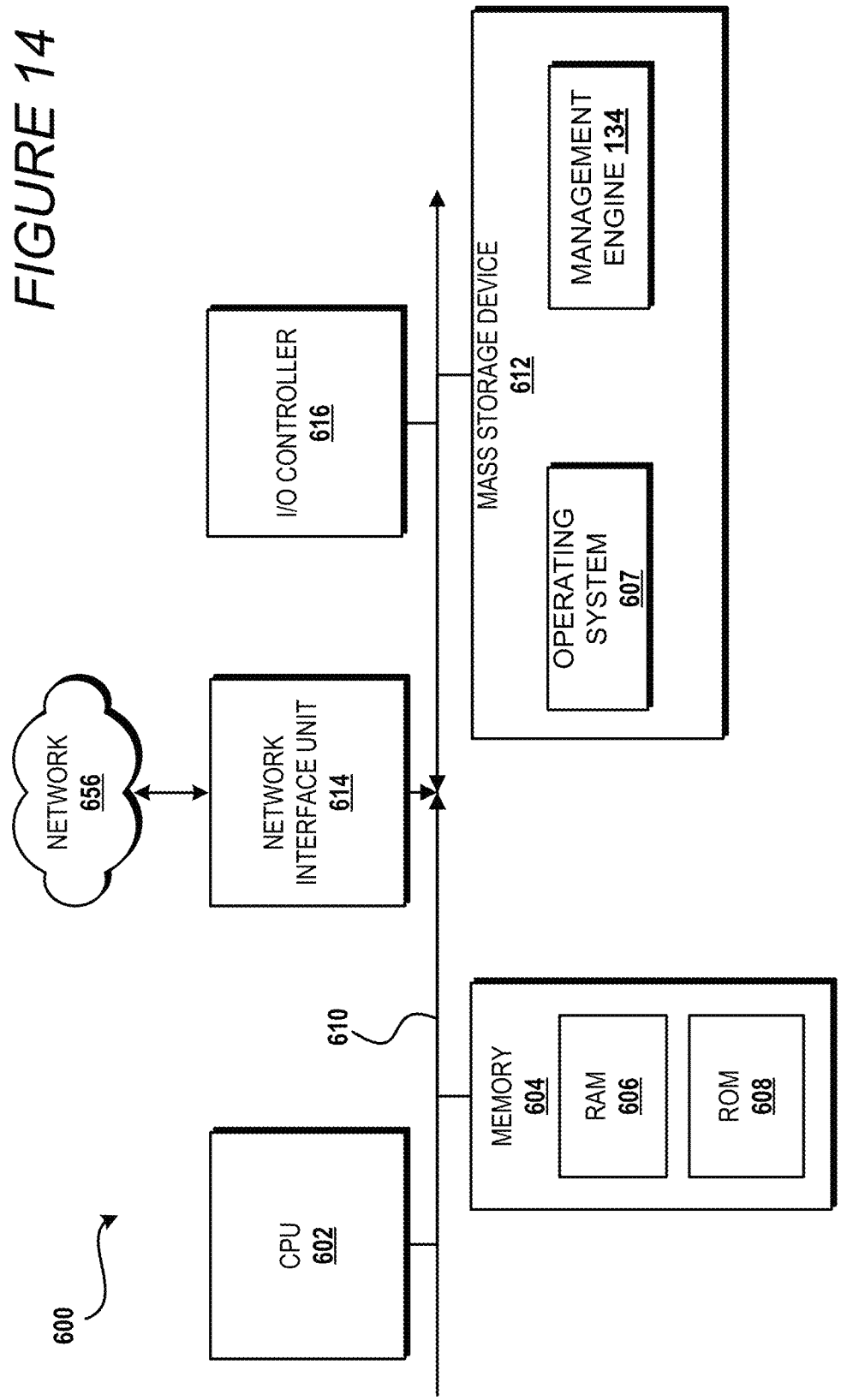
FIG. 14 is a computer architecture diagram illustrating an illustrative computer hardware and software architecture for a computing system capable of implementing aspects of the techniques and technologies presented herein.

FIG. 14 shows additional details of an example computer architecture 600 for a computer, such as the computing device 101 of FIG. 1, capable of executing the program components described herein. Thus, the computer architecture 600 illustrated in FIG. 16 illustrates an architecture for a server computer, a mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 14 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 607, other data, and one or more applications, such as the management engine 134 that can perform the techniques disclosed herein.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 656 and/or another network (not shown). The computer architecture 600 may connect to the network 656 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 14). Similarly, the input/output controller 616 may provide output to a display screen, a printer, or other type of output device (also not shown in FIG. 14).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 14, may include other components that are not explicitly shown in FIG. 14, or may utilize an architecture completely different than that shown in FIG. 14.

Figure 15:
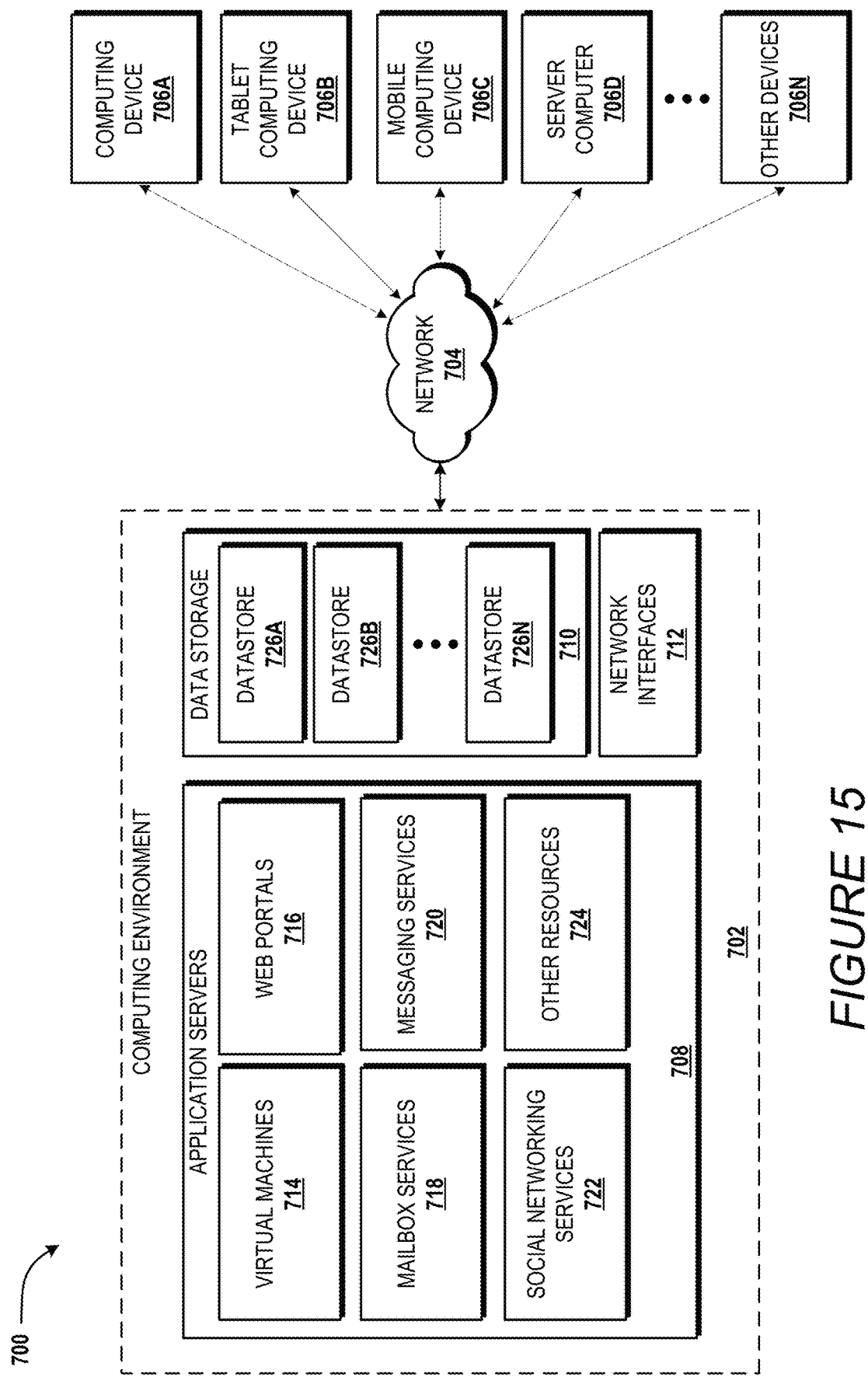
FIG. 15 is a diagram illustrating a distributed computing environment capable of implementing aspects of the techniques and technologies presented herein.

FIG. 15 depicts an illustrative distributed computing environment 700 capable of executing the software components described herein. Thus, the distributed computing environment 700 illustrated in FIG. 15 can be utilized to execute any aspects of the software components presented herein. For example, the distributed computing environment 700 can be utilized to execute aspects of the software components described herein.

According to various implementations, the distributed computing environment 700 includes a computing environment 702 operating on, in communication with, or as part of the network 704. The network 704 may be or may include the network 656, described above with reference to FIG. 14. The network 704 also can include various access networks. One or more client devices 706A-706N (hereinafter referred to collectively and/or generically as "clients 706" and also referred to herein as computing devices 106) can communicate with the computing environment 702 via the network 704 and/or other connections (not illustrated in FIG. 15). In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 706 are illustrated and described herein with reference to FIGS. 5 and 7. It should be understood that the illustrated clients 706 and computing architectures illustrated and described herein are illustrative, and should not be construed as being limited in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated configuration, the application servers 708 host one or more virtual machines 714 for hosting applications or other functionality. According to various implementations, the virtual machines 714 host one or more applications and/or software modules for enabling efficient testing disclosed herein. It should be understood that this configuration is illustrative, and should not be construed as being limiting in any way. The application servers 708 also host or provide access to one or more portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") and presence services including, but not limited to, calendar services, contact management services, collaboration services, and/or other services. The messaging services 720 can include, but are not limited to, instant messaging services, chat services, forum services, and/or other communication services.

The application servers 708 also may include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 722 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above configurations are illustrative, and should not be construed as being limited in any way. According to various implementations, the social networking services 722 may host one or more applications and/or software modules for providing the functionality described herein. For instance, any one of the application servers 708 may communicate or facilitate the functionality and features described herein. For instance, a social networking application, mail client, messaging client or a browser running on a phone or any other client 706 may communicate with a networking service 722 and facilitate the functionality, even in part, described above with respect to FIG. 15. Any device or service depicted herein can be used as a resource for supplemental data, including email servers, storage servers, etc.

As shown in FIG. 15, the application servers 708 also can host other services, applications, portals, and/or other resources ("other resources") 724. The other resources 724 can include, but are not limited to, document sharing, rendering or any other functionality. It thus can be appreciated that the computing environment 702 can provide integration of the concepts and technologies disclosed herein with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data. Although not illustrated in FIG. 15, the datastores 726 also can host or store web page documents, word documents, presentation documents, data structures, algorithms for execution by a recommendation engine, and/or other data utilized by any application program or another module. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects. In one specific example, as summarized above, techniques described herein may be implemented, at least in part, by web browser application, which works in conjunction with the application servers 708 of FIG. 15.

Turning now to FIG. 16, an illustrative computing device architecture 800 for a computing device that is capable of executing various software components described herein for enabling the techniques disclosed herein. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 800 is applicable to any of the computing devices shown in the figures. Moreover, aspects of the computing device architecture 800 may be applicable to traditional desktop computers, portable computers (e.g., phones, laptops, notebooks, ultra-portables, and netbooks), server computers, and other computer systems, such as described herein with reference to FIG. 1. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 16 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individuals components illustrated in FIG. 16, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks, including the network 604 of FIG. 14. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 822 is configured to provide dual-multi-mode connectivity to the network 856. For example, the WWAN component 822 may be configured to provide connectivity to the network 856, wherein the network 856 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 832 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems. The GPS sensor 838 can also operate in conjunction with other components, such as the processor 802, to generate positioning data for the computing device 800.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interface described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via an I/O component.

The following clauses are to supplement the techniques disclosed herein.

Clause A: A computer-implemented method for mitigating forked tenant user groups while enabling user-initiated configuration of tenants in a multi-tenant service, the computer-implemented method configured for execution on a computing device (101) comprising: receiving an initial request (111A) causing a generation of a first tenant (102A), the initial request (111A) sent from a first user (10A) associated with a first client computing device (11A), the initial request (111A) associated with configuration data of the first tenant (102A) specifying identifiers of members of the first tenant (102A); receiving a subsequent request (111B) for generating a second tenant (102B), the subsequent request (111B) sent from a second user (10B) associated with a second client computing device (11B); in response to the subsequent request (111B) for generating the second tenant (102B) from the second user (10B), analyzing the identifiers of the members of the first tenant (102A) received in association with the initial request (111A) to determine if an identifier of the second user (10B) is included in the identifiers of members of the first tenant (102A) received in association with the initial request (111A); in response to determining that the identifier of the second user (10A) is included in the identifiers of members received in the initial request (111A) to generate the first tenant (102A), causing a display of an invitation (114) at the second client computing device (11B) indicating that the first user (10A) invited the second user (10B) to join the first tenant (102A), wherein the invitation (114) prompts the second user to provide a confirmation input (115) to join the first tenant (102A); and in response to receiving the confirmation input (115) from the second client computing device (11B) indicating an acceptance of the invitation to join the first tenant (102A), granting access permissions to the first tenant (102A) to the identifier of the second user (10B) and cancelling the subsequent request (111B) to generate the second tenant (102B).

Clause B: The computer-implemented method of Clause A, further comprising: sending an identity verification request to the second user requesting a verification input from the second user, wherein the identity verification request is sent to the second user in response to the second user being listed as a member of the first tenant; and causing a display of the invitation to the second user at the second client computing device in response to receiving the verification input from the second user that meets one or more authentication criteria. In one example, a privacy feature will only reveal the invitation after the second user authenticates their identity, e.g., phone number or email.

Clause C: The computer-implemented method of Clauses A-B, wherein the identifiers of the members each include at least one of a phone number for an individual member or an email address for the individual member.

Clause D: The computer-implemented method of Clauses A-C, further comprising receiving configuration data defining roles and permissions for the members of the first tenant, wherein the roles and permissions are activated for individual members in response to receipt of a confirmation input from the individual members indicating that the individual members have accepted the invitation.

Clause E: The computer-implemented method of Clauses A-D, further comprising: in response to receiving member data defining members of the second tenant, causing a display of a confirmation request at the second client computing device prompting the second user to invite the members of the second tenant to join the first tenant; and in response to receiving individual confirmations from the members of the second tenant, updating the configuration data of the first tenant to add the members of the second tenant as members of the first tenant.

Clause F: The computer-implemented method of Clauses A-E, further comprising receiving configuration data associated with an identifier of the first user defining roles and permissions for the members identified in the member data, wherein the roles and permissions are activated for individual members identified in the member data in response to receipt of an individual confirmation input from individual members identified in the member data.

Clause G: The computer-implemented method of Clauses A-F, further comprising receiving configuration data associated with the identifier of the second user defining roles and permissions for the members identified in the member data, wherein the roles and permissions are activated for individual members identified in the member data in response to receipt of an individual confirmation input from individual members identified in the member data.

Clause H: A computer-implemented method for mitigating forked tenant user groups while enabling user-initiated creation of tenants in a multi-tenant computing service, the computer-implemented method configured for execution on a computing device (101) comprising:

receiving a first request (111A) causing a generation of a first tenant (102A) managed by a first user (10A) associated with a first client computing device (11A); receiving a second request (111B) causing a generation of a second tenant (102B) managed by a second user (10B) associated with a second client computing device (11B); receiving configuration data specifying members of the first tenant (102A) managed by the first user (10A), wherein the members of the first tenant (102A) includes an identify of the second user (10B); in response to receiving configuration data specifying the second user (10B) as a member of the first tenant (102A) managed by the first user (10A) after the generation of the first tenant (102A) and after the generation of the second tenant (102B) by the second user (10B), causing a display of an invitation (114) at the second client computing device (11B) indicating that the first user (10A) invited the second user (10B) to join the first tenant (102A); and in response to receiving a confirmation input (115) from the second client computing device (11B) indicating that the second user has accepted the invitation, granting access permissions to the first tenant (102A) to an identifier of the second user (10B) and closing the second tenant (102B) managed by the second user (10B).

Clause I: The computer-implemented method of Clause H, further comprising: sending an identity verification request to the second user requesting a verification input from the second user, wherein the identity verification request is sent to the second user in response to the second user being listed as a member of the first tenant; and causing a display of the invitation to the second user at the second client computing device in response to receiving the verification input from the second user that meets one or more authentication criteria.

Clause J: The computer-implemented method of Clauses H-I, wherein the identifiers of the members each include at least one of a phone number for an individual member or an email address for the individual member.

Clause K: The computer-implemented method of Clauses H-J, further comprising receiving configuration data defining roles and permissions for the members of the first tenant, wherein the roles and permissions are activated for individual members in response to receipt of a confirmation input from the individual members indicating that the individual members have accepted the invitation.

Clause L: The computer-implemented method of Clauses H-K, further comprising: in response to receiving member data defining members of the second tenant, causing a display of a confirmation request at the second client computing device prompting the second user to invite the members of the second tenant to join the first tenant; and in response to receiving individual confirmations from the members of the second tenant, updating the configuration data of the first tenant to add the members of the second tenant as members of the first tenant.

Clause M: A computing device (800) for mitigating forked tenant user groups while enabling user-initiated creation of tenants in a multi-tenant service, comprising: one or more processing units (802); and a computer-readable storage medium (804) having encoded thereon computer-executable instructions to cause the one or more processing units (802) to receive a plurality of requests (111) to generate a plurality of tenants (102), wherein individual requests (111A-111N) of the plurality of requests (111) are each associated with users indicating an intention to create individual tenants (102); analyze the plurality of requests (111) to determine that a number of the requests (111) exceeds meets a request count threshold within a time period; and in response to determining that the number of the requests (111) exceeds meets the request count threshold within the time period, analyze one or more characteristics associated with the individual requests (111) to determine that at least one characteristic meets of the individual requests (111) meets one or more criteria; and configuring a single tenant having a select group of members (140) each associated with the individual requests (111) that meets one or more criteria and the individual requests (111) that are received within the time period during which the number of the requests (111) exceeds meets the request count threshold.

Clause N: The computing device of Clause M, wherein the at least one characteristic of the individual requests comprises a network address of a source for each of the individual requests, and wherein the at least one characteristic meets of the individual requests meets one or more criteria when the network address of each of the individual requests is within one or more predetermined address ranges.

Clause O: The computing device of Clauses M-N, wherein the at least one characteristic of the individual requests comprises a domain name associated with a user initiating a single request of the individual requests, and wherein the at least one characteristic meets of the individual requests meets one or more criteria when the domain name of each of the individual requests has matching domain name.

Clause P: The computing device of Clauses M-O, wherein the at least one characteristic of the individual requests comprises a domain name associated with a user initiating a single request of the individual requests, and wherein the at least one characteristic meets of the individual requests meets one or more criteria when the domain name of each of the individual requests have at least a matching portion of the domain name.

Clause Q: The computing device of Clauses M-P, wherein the at least one characteristic of the individual requests comprises an entity name associated with a user initiating a single request of the individual requests, and wherein the at least one characteristic meets of the individual requests meets one or more criteria when the domain entity of each of the individual requests has a threshold level of equivalency.

Clause R: A computer-implemented method for mitigating forked tenant user groups while enabling user-initiated creation of tenants in a multi-tenant service, the computer-implemented method configured for execution on a computing device (101) comprising: receiving a first request (111A) from a first user (10A) associated with a first client computing device (11A) causing a generation of a first tenant (102A), the first request (111A) including a first entity name; receiving a second request (111B) from a second user (10B) associated with a second client computing device (11B), the second request indicating an intent to generate a second tenant (102B), the second request (111B) including a second entity name; in response to receiving the first request (111A) including the first entity name and the second request (111B) including the second entity name, analyzing the first entity name and the second entity name to determine that the first entity name and the second entity name have meet a threshold level condition of equivalency; in response to determining that the first entity name and the second entity name have meet the threshold level condition of equivalency, causing a display of an invitation (114) at the second client computing device (11B) notifying the second user of the first tenant and a prompt to the second user to provide a confirmation input (115) to join the first tenant (102A); and in response to receiving the confirmation input (115) from the second client computing device (11B) associated with the second user, granting permissions to an identifier of the second user (10B) for accessing the first tenant (102A) and cancelling the second request (111B) to generate the second tenant (102B).

Clause S: A computer-implemented method of Clause R, further comprising: sending an identity verification request to the second user requesting a verification input from the second user, wherein the identity verification request is sent to the second user in response to the second user being listed as a member of the first tenant; and in response to receiving the verification input from the second user that meets one or more authentication criteria, causing a display of the invitation to the second user at the second client computing device, wherein the display of the invitation reveals an identity of the first user.

Clause T: A computer-implemented method of Clauses R-S, wherein the identifiers of the members each include at least one of a phone number for an individual member or an email address for the individual member.

Clause U: A computer-implemented method of Clause R-T, further comprising receiving configuration data defining roles and permissions for the members of the first tenant, wherein the roles and permissions are activated for individual members in response to receipt of a confirmation input indicating that the individual members have accepted the invitation.

Clause V: A computer-implemented method of Clauses R-U, in response to receiving member data defining members of the second tenant, causing a display of a confirmation request at the second client computing device prompting the second user to invite the members of the second tenant to join the first tenant; in response to receiving a confirmation from the second user to invite the members of the second tenant to join the first tenant, sending individual invitations to each of the members of the second tenant, the individual invitations prompting the each of the members of the second tenant to join the first tenant; and in response to receiving individual confirmations from the members of the second tenant, updating the configuration data of the first tenant to grant access permissions to the members of the second tenant.

Clause W: A computer-implemented method of Clauses R-V, wherein the display of the invitation at the second client computing device is in response to determining that the first entity name and the second entity name have the threshold level of equivalency and in response to determining that a first network address indicating a source of the first request and a second network address indicating a source of the second request are both within a predetermined address range.

Clause X: A computer-implemented method of Clauses R-W, wherein the display of the invitation at the second client computing device is in response to determining that the first entity name and the second entity name have the threshold level of equivalency and in response to determining that a first network address indicating a source of the first request and a second network address indicating a source of the second request are both within a predetermined address range, and in response to determining that the first request and second request were received in a time period where a request rate exceeded a rate threshold.

Clause Y: A computer-implemented method for mitigating forked tenant user groups while enabling user-initiated configuration of a multi-tenant service, the computer-implemented method configured for execution on a computing device (101) comprising: receiving a plurality of requests (111) to configure a plurality of tenants (102); in response to determining that an identifier of an individual user (10B) is included in at least one request initiated by another individual user (10A), causing a display of an invitation at the client computing device (11B) of the individual user (10B) prompts the second user to provide a confirmation input (115) to join a tenant (102A) managed by with the another individual user (10A), and in response to receiving the confirmation input (115) from the second client computing device (11B), granting permissions to the identifier of the individual user (10B) for allowing access to the first tenant (102A); or in response to determining that the identifier of the individual user (10B) is not included in he the at least one request initiated by another individual user (10A), analyze the plurality of requests to determine if a subset of the plurality of requests have request characteristics that meet one or more criteria, send invitations to a select group of members (140) associated with the subset of the plurality of requests, the invitations prompting the set of users to respond with one or more confirmation requests, and configuring a single tenant granting access to the select group of members (140) in response to receiving one or more confirmation requests from the select group of members (140).

Clause Z: A computer-implemented method of Clause Y, further comprising: sending an identity verification request to the second user requesting a verification input from the second user, wherein the identity verification request is sent to the second user in response to the second user being listed as a member of the first tenant; and in response to receiving the verification input from the second user that meets one or more authentication criteria, causing a display of the invitation to the second user at the second client computing device, wherein the display of the invitation reveals an identity of the first user.

Clause AA: A computer-implemented method of Clause Y-Z, wherein the identifiers of the members each include at least one of a phone number for an individual member or an email address for the individual member.

Clause BB: A computer-implemented method of Clause Y-AA, further comprising receiving configuration data defining roles and permissions for the members of the first tenant, wherein the roles and permissions are activated for individual members in response to receipt of a confirmation input indicating that the individual members have accepted the invitation.

Clause CC: A computer-implemented method of Clause Y-AA, further comprising: in response to receiving member data defining members of a second tenant, causing a display of a confirmation request at the second client computing device prompting the second user to invite the members of the second tenant to join the first tenant; in response to receiving a confirmation from the second user to invite the members of the second tenant to join the first tenant, sending individual invitations to each of the members of the second tenant, the individual invitations prompting the each of the members of the second tenant to join the first tenant; and in response to receiving individual confirmations from the members of the second tenant, updating the configuration data of the first tenant to grant access permissions to the members of the second tenant.

Clause DD: A computer-implemented method of Clause Y-CC, wherein the request characteristics comprise a network address of a source for individual requests of the plurality of requests, and wherein the request characteristics meets the one or more criteria when the network address of each of the subset of the plurality of requests is within one or more predetermined address ranges.

Clause EE: A computer-implemented method of Clause Y-DD, wherein the request characteristics comprise a domain name associated with a user initiating a single request of the plurality of requests, and wherein the at least one characteristic meets of the subset of the plurality of requests meets one or more criteria when the domain name of each of the subset of the plurality of requests has matching domain name.

Clause FF: A computer-implemented method of Clause Y-EE, wherein the request characteristics comprises a domain name associated with a user initiating a single request of the individual requests, and wherein the at least one characteristic meets of the individual requests meets one or more criteria when the domain name of each of the subset of the plurality of requests have at least a matching portion of the domain name.

In closing, although the various configurations have been described in language specific to structural features and/or methodological acts, it is to be understood that the subject matter defined in the appended representations is not necessarily limited to the specific features or acts described.

Rather, the specific features and acts are disclosed as example forms of implementing the claimed subject matter.

The invention claimed is:

1. A computer-implemented method for mitigating forked tenant user groups while enabling user-initiated configuration of tenants in a multi-tenant service, the computer-implemented method configured for execution on a computing device comprising:

receiving an initial request causing a generation of a first tenant, the initial request sent from a first user associated with a first client computing device, the initial request associated with configuration data of the first tenant specifying identifiers of members of the first tenant;

receiving a subsequent request for generating a second tenant, the subsequent request sent from a second user associated with a second client computing device;

in response to the subsequent request for generating the second tenant from the second user, analyzing the identifiers of the members of the first tenant received in association with the initial request to determine if an identifier of the second user is included in the identifiers of members of the first tenant received in association with the initial request;

in response to determining that the identifier of the second user is included in the identifiers of members received in the initial request to generate the first tenant, causing a display of an invitation at the second client computing device indicating that the first user invited the second user to join the first tenant, wherein the invitation prompts the second user to provide a confirmation input to join the first tenant; and in response to receiving the confirmation input from the second client computing device indicating an acceptance of the invitation to join the first tenant, granting access permissions to the first tenant to the identifier of the second user and cancelling the subsequent request to generate the second tenant.

2. The computer-implemented method of claim 1, further comprising:

sending an identity verification request to the second user requesting a verification input from the second user, wherein the identity verification request is sent to the second user in response to the second user being listed as a member of the first tenant; and causing a display of the invitation to the second user at the second client computing device in response to receiving the verification input from the second user that meets one or more authentication criteria.

3. The computer-implemented method of claim 1, wherein the identifiers of the members each include at least one of a phone number for an individual member or an email address for the individual member.

4. The computer-implemented method of claim 1, further comprising receiving configuration data defining roles and permissions for the members of the first tenant, wherein the roles and permissions are activated for individual members in response to receipt of a confirmation input from the individual members indicating that the individual members have accepted the invitation.

5. The computer-implemented method of claim 1, further comprising:

in response to receiving member data defining members of the second tenant, causing a display of a confirmation request at the second client computing device prompting the second user to invite the members of the second tenant to join the first tenant; and in response to receiving individual confirmations from the members of the second tenant, updating the configuration data of the first tenant to add the members of the second tenant as members of the first tenant.

6. The computer-implemented method of claim 5, further comprising receiving configuration data associated with an identifier of the first user defining roles and permissions for the members identified in the member data, wherein the roles and permissions are activated for individual members identified in the member data in response to receipt of an individual confirmation input from individual members identified in the member data.

7. The computer-implemented method of claim 5, further comprising receiving configuration data associated with the identifier of the second user defining roles and permissions for the members identified in the member data, wherein the roles and permissions are activated for individual members identified in the member data in response to receipt of an individual confirmation input from individual members identified in the member data.

8. A computer-implemented method for mitigating forked tenant user groups while enabling user-initiated creation of tenants in a multi-tenant service, the computer-implemented method configured for execution on a computing device comprising:

receiving a first request from a first user associated with a first client computing device causing a generation of a first tenant, the first request including a first entity name or a first domain name;

receiving a second request from a second user associated with a second client computing device, the second request indicating an intent to generate a second tenant, the second request including a second entity name or a second domain name;

in response to receiving the first request including the first entity name or the first domain name and the second request including the second entity name or the second domain name, analyzing the first entity name and the second entity name to determine that the first entity name and the second entity name have a threshold level of equivalency and analyzing the first domain name and the second domain name to determine that the first domain name and the second domain name meet the threshold level condition of equivalency;

in response to determining that the first entity name and the second entity name or the first domain name and the second domain name meet the threshold level condition of equivalency, causing a display of an invitation at the second client computing device notifying the second user of the first tenant and a prompt to the second user to provide a confirmation input to join the first tenant; and in response to receiving the confirmation input from the second client computing device associated with the second user, granting permissions to an identifier of the second user for accessing the first tenant and cancelling the second request to generate the second tenant.

9. The computer-implemented method of claim 8, further comprising: sending an identity verification request to the second user requesting a verification input from the second user, wherein the identity verification request is sent to the second user in response to the second user being listed as a member of the first tenant; and in response to receiving the verification input from the second user that meets one or more authentication criteria, causing a display of the invitation to the second user at the second client computing device, wherein the display of the invitation reveals an identity of the first user.

10. The computer-implemented method of claim 8, wherein the identifiers of the members each include at least one of a phone number for an individual member or an email address for the individual member.

11. The computer-implemented method of claim 8, further comprising receiving configuration data defining roles and permissions for the members of the first tenant, wherein the roles and permissions are activated for individual members in response to receipt of a confirmation input indicating that the individual members have accepted the invitation.

12. The computer-implemented method of claim 8, further comprising:
in response to receiving member data defining members of the second tenant, causing a display of a confirmation request at the second client computing device prompting the second user to invite the members of the second tenant to join the first tenant;
in response to receiving a confirmation from the second user to invite the members of the second tenant to join the first tenant, sending individual invitations to each of the members of the second tenant, the individual invitations prompting the each of the members of the second tenant to join the first tenant; and
in response to receiving individual confirmations from the members of the second tenant, updating the configuration data of the first tenant to grant access permissions to the members of the second tenant.

13. The computer-implemented method of claim 8, wherein the display of the invitation at the second client computing device is in response to determining that the first entity name and the second entity name have the threshold level of equivalency and in response to determining that a first network address indicating a source of the first request and a second network address indicating a source of the second request are both within a predetermined address range.

14. The computer-implemented method of claim 8, wherein the display of the invitation at the second client computing device is in response to determining that the first entity name and the second entity name have the threshold level of equivalency and in response to determining that a first network address indicating a source of the first request and a second network address indicating a source of the second request are both within a predetermined address range, and in response to determining that the first request and second request were received in a time period where a request rate exceeded a rate threshold.

15. A computer-implemented method for mitigating forked tenant user groups while enabling user-initiated configuration of a multi-tenant service, the computer-implemented method configured for execution on a computing device comprising:
receiving a plurality of requests to configure a plurality of tenants;
in response to determining that an identifier of an individual user is included in at least one request initiated by another individual user,
causing a display of an invitation at the client computing device of the individual user prompts the second user to provide a confirmation input to join a tenant managed by with the another individual user, and
in response to receiving the confirmation input from the second client computing device, granting permissions to the identifier of the individual user for allowing access to the first tenant; or
in response to determining that the identifier of the individual user is not included in the at least one request initiated by another individual user,
analyze the plurality of requests to determine if a subset of the plurality of requests have request characteristics that meet one or more criteria,
send invitations to a select group of members associated with the subset of the plurality of requests, the invitations prompting the set of users to respond with one or more confirmation requests, and
configuring a single tenant granting access to the select group of members in response to receiving one or more confirmation requests from the select group of members.

16. The computer-implemented method of claim 15, further comprising:
sending an identity verification request to the second user requesting a verification input from the second user, wherein the identity verification request is sent to the second user in response to the second user being listed as a member of the first tenant; and
in response to receiving the verification input from the second user that meets one or more authentication criteria, causing a display of the invitation to the second user at the second client computing device, wherein the display of the invitation reveals an identity of the first user.

17. The computer-implemented method of claim 15, wherein the identifiers of the members each include at least one of a phone number for an individual member or an email address for the individual member.

18. The computer-implemented method of claim 15, further comprising receiving configuration data defining roles and permissions for the members of the first tenant, wherein the roles and permissions are activated for individual members in response to receipt of a confirmation input indicating that the individual members have accepted the invitation.

19. The computer-implemented method of claim 15, further comprising:
in response to receiving member data defining members of a second tenant, causing a display of a confirmation request at the second client computing device prompting the second user to invite the members of the second tenant to join the first tenant;
in response to receiving a confirmation from the second user to invite the members of the second tenant to join the first tenant, sending individual invitations to each of the members of the second tenant, the individual invitations prompting the each of the members of the second tenant to join the first tenant; and
in response to receiving individual confirmations from the members of the second tenant, updating the configuration data of the first tenant to grant access permissions to the members of the second tenant.

20. The computer-implemented method of claim 15, wherein the request characteristics comprise a network address of a source for individual requests of the plurality of requests, and wherein the request characteristics meets the one or more criteria when the network address of each of the subset of the plurality of requests is within one or more predetermined address ranges.

* * * * *